United States Patent [19]

Masschelein et al.

[11] Patent Number: 6,103,678
[45] Date of Patent: Aug. 15, 2000

[54] COMPOSITIONS COMPRISING A PERFUME AND AN AMINO-FUNCTIONAL POLYMER

[75] Inventors: Axel Masschelein, Brussels; Christiaan Arthur Jacques Kamiel Thoen, Haasdonk, both of Belgium

[73] Assignee: The Procter & Gamble Company, Cincinnati, Ohio

[21] Appl. No.: 09/297,775

[22] PCT Filed: Nov. 6, 1997

[86] PCT No.: PCT/US97/18474

§ 371 Date: May 7, 1999

§ 102(e) Date: May 7, 1999

[87] PCT Pub. No.: WO98/20102

PCT Pub. Date: May 14, 1998

[30] Foreign Application Priority Data

Nov. 7, 1996 [EP] European Pat. Off. .............. 96870140

[51] Int. Cl.[7] .............................. C11D 3/50; C11D 3/30; C11D 1/62
[52] U.S. Cl. .......................... 510/101; 510/102; 510/104; 510/276; 510/299; 510/300; 510/308; 510/329; 510/330; 510/392; 510/400; 510/504; 510/515; 510/517; 510/520; 510/528
[58] Field of Search ...................... 510/101, 102, 510/104, 276, 299, 300, 308, 329, 330, 392, 400, 504, 515, 517, 520, 528

[56] References Cited

U.S. PATENT DOCUMENTS

| | | | |
|---|---|---|---|
| 4,386,000 | 5/1983 | Turner et al. | 252/8.8 |
| 5,094,761 | 3/1992 | Trinh et al. | 252/8.9 |
| 5,500,138 | 3/1996 | Bacon et al. | 252/8.8 |
| 5,565,145 | 10/1996 | Watson et al. | 510/350 |
| 5,747,443 | 5/1998 | Wahl et al. | 510/515 |
| 5,830,843 | 11/1998 | Hartman et al. | 510/475 |

FOREIGN PATENT DOCUMENTS

| | | | |
|---|---|---|---|
| 0 601035 | 5/1996 | European Pat. Off. | C11D 17/00 |
| WO 95/32272 | 11/1995 | WIPO | C11D 3/37 |
| WO 96/04940 | 2/1996 | WIPO | A61L 9/01 |

OTHER PUBLICATIONS

Chemical Abstract #XP 002031278, vol. 123, No. 8, (Aug. 21, 1995).

Primary Examiner—Yogendra Gupta
Assistant Examiner—Charles Boyer
Attorney, Agent, or Firm—Dara M. Kendall; Kim Wm. Zerby

[57] ABSTRACT

The present invention relates to a fabric treatment composition comprising a hydrophilic perfume and an amino-functional polymer, whereby effective perfume substantivity on the treated fabrics is obtained.

25 Claims, No Drawings

COMPOSITIONS COMPRISING A PERFUME AND AN AMINO-FUNCTIONAL POLYMER

This application is a 371 of PCT/US97/18474 filed Nov. 6, 1997.

FIELD OF THE INVENTION

The present invention relates to a fabric treatment composition for effective perfume substantivity on fabrics.

BACKGROUND OF THE INVENTION

Fabrics which exhibit a fresh scent is one of the areas of concern to the consumers. To fulfill such need, perfumes have been incorporated into the compositions for domestic treatment such as in when used in the conventional laundering processes such as pre-treatment, laundry cycle, rinse cycle, tumble drying process and combination thereof. It has now been found that amongst the different classes of perfumes, those which have a hydrophilic character provide a desirable fresh scent.

By "hydrophilic", it is meant that at least 25% by weight of the perfume comprises perfume ingredients having a Clog P of 3 or smaller, as defined hereinafter.

However, a problem encountered with the use of such hydrophilic perfumes is their tendency to be poorly or non-fabric substantive.

Accordingly, it is an object of the invention to provide fabric treatment compositions comprising a hydrophilic perfume, whereby effective perfume substantivity on treated fabrics is obtained.

One solution to this problem is to use a sprayed composition containing said hydrophilic perfume, thereby applying directly the perfume to the fabric without loss of perfume upon domestic treatment. A typical disclosure is described in WO96/04940.

Still another solution is to use a perfume carrier such as a cyclodextrin complex. A typical disclosure can be found in EP-A-0,601,035.

Notwithstanding the advances in the art, there is still a need for a composition containing a hydrophilic perfume, and whereby effective perfume substantivity on fabrics is obtained.

The Applicant has now found that the provision of an amino-functional polymer in a composition containing a hydrophilic perfume fulfills such a need.

Accordingly, it is an advantage of the invention to provide compositions with effective perfume substantivity on the treated fabric.

By "effective perfume substantivity on fabrics", it is meant that a better or equal substantivity of the perfume on the treated fabric is obtained with a composition of the invention compared to fabrics treated with the same perfume composition but no amino-functional polymer.

Still another advantage of the compositions is the resulting care to the colours of the treated fabrics by the present invention compositions.

SUMMARY OF THE INVENTION

The present invention is a composition comprising a perfume and an amino-functional polymer, characterised in that at least 25% by weight of the perfume comprises perfume ingredients having a Clog P of 3 or smaller.

In another aspect of the invention, there is provided a method for providing color care and perfume substantivity on treated fabrics upon domestic treatment which comprises the step of contacting the fabrics with a composition comprising a perfume and an amino-functional polymer, wherein at least 25% by weight of the perfume comprises perfume ingredients having a Clog P of 3 or smaller. The contacting step may occur in an aqueous medium such as in a rinse cycle, pre-treatment process or in a non aqueous medium such as that occurs during a tumble-drying process.

DETAILED DESCRIPTION OF THE INVENTION

Amino-functional polymer

An essential component of the invention is an amino-functional polymer. Indeed, by the present component, the substantivity of the hydrophilic perfume on the treated fabric is increased. Still another advantage of the amino-functional polymer is that they provide care to the colors of fabrics.

The amino-functional polymers of the present invention are water-soluble or dispersible, polyamines. Typically, the amino-functional polymers for use herein have a molecular weight between 200 and $10^6$, preferably between 600 and 20,000, most preferably between 1000 and 10,000. These polyamines comprise backbones that can be either linear or cyclic. The polyamine backbones can also comprise polyamine branching chains to a greater or lesser degree. Preferably, the polyamine backbones described herein are modified in such a manner that at least one, preferably each nitrogen of the polyamine chain is thereafter described in terms of a unit that is substituted, quaternized, oxidized, or combinations thereof.

For the purposes of the present invention the term "modification" as it relates to the chemical structure of the polyamines is defined as replacing a backbone —NH hydrogen atom by an R' unit (substitution), quaternizing a backbone nitrogen (quaternized) or oxidizing a backbone nitrogen to the N-oxide (oxidized). The terms "modification" and "substitution" are used interchangably when referring to the process of replacing a hydrogen atom attached to a backbone nitrogen with an R' unit. Quaternization or oxidation may take place in some circumstances without substitution, but substitution is preferably accompanied by oxidation or quaternization of at least one backbone nitrogen.

The linear or non-cyclic polyamine backbones that comprise the amino-functional polymer have the general formula:

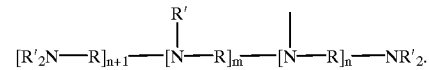

The cyclic polyamine backbones that comprise the amino-functional polymer have the general formula:

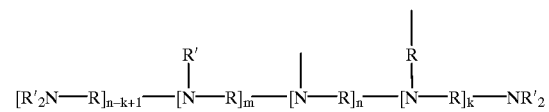

The above backbones prior to optional but preferred subsequent modification, comprise primary, secondary and tertiary amine nitrogens connected by R "linking" units For the purpose of the present invention, primary amine nitrogens comprising the backbone or branching chain once modified are defined as V or Z "terminal" units. For example, when a primary amine moiety, located at the end of the main polyamine backbone or branching chain having the structure

is modified according to the present invention, it is thereafter defined as a V "terminal" unit, or simply a V unit. However, for the purposes of the present invention, some or all of the primary amine moieties can remain unmodified subject to the restrictions further described herein below. These unmodified primary amine moieties by virtue of their position in the backbone chain remain "terminal" units. Likewise, when a primary amine moiety, located at the end of the main polyamine back one having the structure

is modified according to the present invention, it is thereafter defined as a Z "terminal" unit, or simply a Z unit. This unit can remain unmodified subject to the restrictions further described herein below.

In a similar manner, secondary amine nitrogens comprising the backbone or branching chain once modified are defined as W "backbone" units. For example, when a secondary amine moiety, the major constituent of the backbones and branching chains of the present invention, having the structure

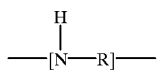

is modified according to the present invention, it is thereafter defined as a W "backbone" unit, or simply a W unit. However, for the purposes of the present invention, some or all of the secondary amine moieties can remain unmodified. These unmodified secondary amine moieties by virtue of their position in the backbone chain remain "backbone" units.

In a further similar manner, tertiary amine nitrogens comprising the backbone or branching chain once modified are further referred to as Y "branching" units. For example, when a tertiary amine moiety, which is a chain branch point of either the polyamine backbone or other branching chains or rings, having the structure

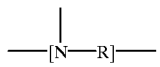

is modified according to the present invention, it is thereafter defined as a Y "branching" unit, or simply a Y unit. However, for the purposes of the present invention, some or all or the tertiary amine moieties can remain unmodified. These unmodified tertiary amine moieties by virtue of their position in the backbone chain remain "branching" units. The R units associated with the V, W and Y unit nitrogens which serve to connect the polyamine nitrogens, are described herein below.

The final modified structure of the polyamines of the present invention can be therefore represented by the general formula

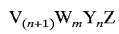

for linear amino-functional polymer and by the general formula

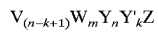

for cyclic amino-functional polymer. For the case of polyamines comprising rings, a Y' unit of the formula

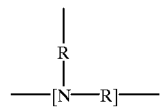

serves as a branch point for a backbone or branch ring. For every Y' unit there is a Y unit having the formula

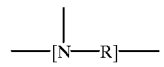

that will form the connection point of the ring to the main polymer chain or branch. In the unique case where the backbone is a complete ring, the polyamine backbone has the formula

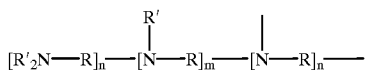

therefore comprising no Z terminal unit and having the formula

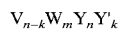

wherein k is the number of ring forming branching units. Preferably the polyamine backbones of the present invention comprise no rings.

In the case of non-cyclic polyamines, the ratio of the index n to the index m relates to the relative degree of branching. A fully non-branched linear modified polyamine according to the present invention has the formula that is, n is equal to 0. The greater the value of n (the lower the ratio of m to n), the greater the degree of branching in the molecule. Typically the value for m ranges from a minimum value of 2 to 700, preferably 4 to 400, however larger values of m, especially when the value of the index n is very low or nearly 0, are also preferred.

Each polyamine nitrogen whether primary, secondary or tertiary, once modified according to the present invention, is further defined as being a member of one of three general classes; simple substituted, quaternized or oxidized. Those polyamine nitrogen units not modified are classed into V, W, Y, Y' or Z units depending on whether they are primary, secondary or tertiary nitrogens. That is unmodified primary amine nitrogens are V or Z units, unmodified secondary amine nitrogens are W units or Y' units and unmodified tertiary amine nitrogens are Y units for the purposes of the present invention.

Modified primary amine moieties are defined as V "terminal" units having one of three forms:

a) simple substituted units having the structure:

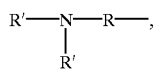

b) quaternized units having the structure:

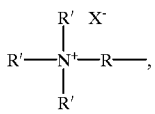

wherein X is a suitable counter ion providing charge balance; and c) oxidized units having the structure:

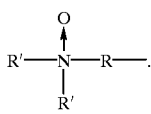

Modified secondary amine moieties are defined as W "backbone" units having one of three forms:

a) simple substituted units having the structure:

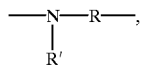

b) quaternized units having the structure:

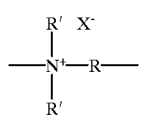

wherein X is a suitable counter ion providing charge balance; and c) oxidized units having the structure:

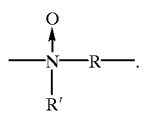

Other modified secondary amine moieties are defined as Y' units having one of three forms:

a) simple substituted units having the structure:

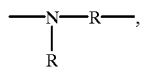

b) quaternized units having the structure:

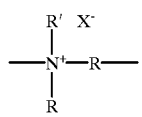

wherein X is a suitable counter ion providing charge balance; and c) oxidized units having the structure:

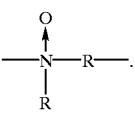

Modified tertiary amine moieties are defined as Y "branching" units having one of three forms:

a) unmodified units having the structure:

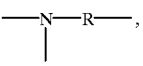

b) quaternized units having the structure:

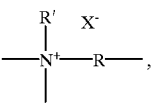

wherein X is a suitable counter ion providing charge balance; and c) oxidized units having the structure:

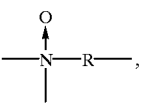

Certain modified primary amine moieties are defined as Z "terminal" units having one of three forms:

a) simple substituted units having the structure:

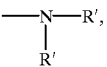

b) quaternized units having the structure:

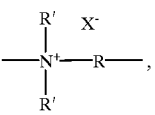

wherein X is a suitable counter ion providing charge balance; and c) oxidized units having the structure:

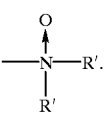

When any position on a nitrogen is unsubstituted of unmodified, it is understood that hydrogen will substitute for R'. For example, a primary amine unit comprising one R' unit in the form of a hydroxyethyl moiety is a V terminal unit having the formula $(HOCH_2CH_2)HN-$.

For the purposes of the present invention there are two types of chain terminating units, the V and Z units. The Z "terminal" unit derives from a terminal primary amino moiety of the structure —$NH_2$. Non-cyclic polyamine backbones according to the present invention comprise only one Z unit whereas cyclic polyamines can comprise no Z units. The Z "terminal" unit can be substituted with any of the R' units described further herein below, except when the Z unit is modified to form an N-oxide. In the case where the Z unit nitrogen is oxidized to an N-oxide, the nitrogen must be modified and therefore R' cannot be a hydrogen.

The polyamines of the present invention comprise backbone R "linking" units that serve to connect the nitrogen-atoms of the backbone. R units comprise units that for the purposes of the present invention are referred to as "hydrocarbyl R" units and "oxy R" units. The "hydrocarbyl" R units are $C_2$–$C_{12}$ alkylene, $C_4$–$C_{12}$ alkenylene, $C_3$–$C_{12}$ hydroxyalkylene wherein the hydroxyl moiety may take any position on the R unit chain except the carbon atoms directly connected to the polyamine backbone nitrogens; $C_4$–$C_{12}$ dihydroxyalkylene wherein the hydroxyl moieties may occupy any two of the carbon atoms of the R unit chain except those carbon atoms directly connected to the polyamine backbone nitrogens; $C_8$–$C_{12}$ dialkylarylene which for the purpose of the present invention are arylene moieties having two alkyl substituent groups as part of the linking chain. For example, a dialkylarylene unit has the formula

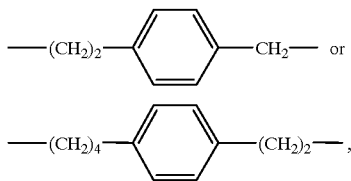

although the unit need not be 1,4-substituted, but can also be 1,2 or 1,3 substituted $C_2$–$C_{12}$ alkylene, preferably ethylene, 1,2-propylene, and mixtures thereof, more preferably ethylene. The "oxy" R units comprise —$(R^1O)_xR^5(OR^1)_x$—, —$CH_2CH(OR^2)CH_2O)_z(R^1O)_yR^1(OCH_2CH(OR^2)CH_2)_w$—, —$CH_2CH(OR^2)CH_2$—, —$(R^1O)_xR^1$—, and mixtures thereof. Preferred R units are selected from the group consisting of $C_2$–$C_{12}$ alkylene, $C_3$–$C_{12}$ hydroxyalkylene, $C_4$–$C_{12}$ dihydroxyalkylene, $C_8$–$C_{12}$ dialkylarylene, —$(R^1O)_xR^1$—, —$CH_2CH(OR^2)CH_2$—, —$(CH_2CH(OH)CH_2O)_z(R^1O)_yR^1(OCH_2CH—(OH)CH_2)_w$—, —$(R^1O)_xR^5(OR^1)_x$—, more preferred R units are $C_2$–$C_{12}$ alkylene, $C_3$–$C_{12}$ hydroxy-alkylene, $C_4$–$C_{12}$ dihydroxyalkylene, —$(R^1O)_xR^1$—, —$(R^1O)_xR^5(OR^1)_x$—, —$(CH_2CH(OH)CH_2O)_z(R^1O)_yR^1(OCH_2CH—(OH)CH_2)_w$—, and mixtures thereof, even more preferred R units are $C_2$–$C_{12}$ alkylene, $C_3$ hydroxyalkylene, and mixtures thereof, most preferred are $C_2$–$C_6$ alkylene. The most preferred backbones of the present invention comprise at least 50% R units that are ethylene.

$R^1$ units are $C_2$–$C_6$ alkylene, and mixtures thereof, preferably ethylene.

$R^2$ is hydrogen, and —$(R^1O)_xB$, preferably hydrogen. $R^3$ is $C_1$–$C_{18}$ alkyl, $C_7$–$C_{12}$ arylalkylene, $C_7$–$C_{12}$ alkyl substituted aryl, $C_6$–$C_{12}$ aryl, and mixtures thereof, preferably $C_1$–$C_{12}$ alkyl, $C_7$–$C_{12}$ arylalkylene, more preferably $C_1$–$C_{12}$ alkyl, most preferably methyl. $R^3$ units serve as part of R' units described herein below.

$R^4$ is $C_1$–$C_{12}$ alkylene, $C_4$–$C_{12}$ alkenylene, $C_8$–$C_{12}$ arylalkylene, $C_6$–$C_{10}$ arylene, preferably $C_1$–$C_{10}$ alkylene, $C_8$–$C_{12}$ arylalkylene, more preferably $C_2$–$C_8$ alkylene, most preferably ethylene or butylene.

$R^5$ is $C_1$–$C_{12}$ alkylene, $C_3$–$C_{12}$ hydroxyalkylene, $C_4$–$C_{12}$ dihydroxyalkylene, $C_8$–$C_{12}$ dialkylarylene, —$C(O)$—, —$C(O)NHR^6NHC(O)$—, —$C(O)(R^4)_rC(O)$—, —$R^1(OR^1)$—, —$CH_2CH(OH)CH_2O(R^1O)_yR^1OCH_2CH(OH)CH_2$—, —$C(O)(R^4)_rC(O)$—, —$CH_2CH(OH)CH_2$—, $R^5$ is preferably ethylene, —$C(O)$—, —$C(O)NHR^6NHC(O)$—, —$R^1(OR^1)$—, —$CH_2CH(OH)CH_2$—, —$CH_2CH(OH)CH_2O(R^1O)_yR^1OCH_2CH—(OH)CH_2$—, more preferably —$CH_2CH(OH)CH_2$—.

$R^6$ is $C_2$–$C_{12}$ alkylene or $C_6$–$C_{12}$ arylene.

The preferred "oxy" R units are further defined in terms of the $R^1$, $R^2$, and $R^5$ units. Preferred "oxy" R units comprise the preferred $R^1$, $R^2$, and $R^5$ units. The preferred cotton soil release agents of the present invention comprise at least 50% $R^1$ units that are ethylene. Preferred $R^1$, $R^2$, and $R^5$ units are combined with the "oxy" R units to yield the preferred "oxy" R units in the following manner.

i) Substituting more preferred $R^5$ into —$(CH_2CH_2O)_xR^5(OCH_2CH_2)_x$— yields —$(CH_2CH_2O)_xCH_2CHOHCH_2(OCH_2CH_2)_x$—.
  ii) Substituting preferred $R^1$ and $R^2$ into —$(CH_2CH(OR^2)CH_2O)_z$—$(R^1O)_yR^1O(CH_2CH(OR^2)CH_2)_w$— yields —$(CH_2CH(OH)CH_2O)_z$—$(CH_2CH_2O)_yCH_2CH_2O(CH_2CH(OH)CH_2)_w$—.
  iii) Substituting preferred $R^2$ into —$CH_2CH(OR^2)CH_2$— yields —$CH_2CH(OH)CH_2$—.

R' units are selected from the group consisting of hydrogen, $C_1$–$C_{22}$ alkyl, $C_3$–$C_{22}$ alkenyl, $C_7$–$C_{22}$ arylalkyl, $C_2$–$C_{22}$ hydroxyalkyl, —$(CH_2)_pCO_2M$, —$(CH_2)_qSO_3M$, —$CH(CH_2CO_2M)CO_2M$, —$(CH_2)_pPO_3M$, —$(R^1O)_mB$, —$C(O)R^3$, preferably hydrogen, $C_2$–$C_{22}$ hydroxyalkylene, benzyl, $C_1$–$C_{22}$ alkylene, —$(R^1O)_mB$, —$C(O)R^3$, —$(CH_2)_pCO_2M$, —$(CH_2)_qSO_3M$, —$CH(CH_2CO_2M)CO_2M$, more preferably $C_1$–$C_{22}$ alkylene, $(R^1O)_xB$, —$C(O)R^3$, —$(CH_2)_pCO_2M$, —$(CH_2)_qSO_3M$, —$CH(CH_2CO_2M)CO_2M$, most preferably $C_1$–$C_{22}$ alkylene, —$(R^1O)_xB$, and —$C(O)R^3$. When no modification or substitution is made on a nitrogen then hydrogen atom will remain as the moiety representing R'. R' units do not comprise hydrogen atom when the V, W or Z units are oxidized, that is the nitrogens are N-oxides. For example, the backbone chain or branching chains do not comprise units of the following structure:

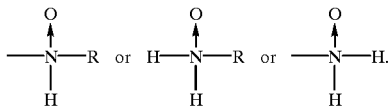

Additionally, R' units do not comprise carbonyl moieties directly bonded to a nitrogen atom when the V, W or Z units are oxidized, that is, the nitrogens are N-oxides. According to the present invention, the R' unit —$C(O)R^3$ moiety is not bonded to an N-oxide modified nitrogen, that is, there are no N-oxide amides having the structure

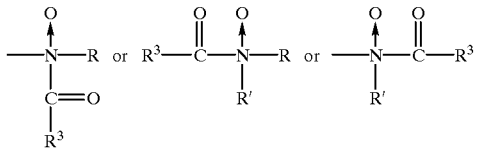

or combinations thereof.

B is hydrogen, $C_1$–$C_6$ alkyl, —$(CH_2)_qSO_3M$, —$(CH_2)_pCO_2M$, —$(CH_2)_q$—$(CHSO_3M)CH_2SO_3M$, —$(CH_2)_q(CHSO_2M)CH_2SO_3M$, —$(CH_2)_pPO_3M$, —$PO_3M$, preferably hydrogen, —$(CH_2)_qSO_3M$, —$(CH_2)_q(CHSO_3M)$ $CH_2SO_3M$, —$(CH_2)_q$—$(CHSO_2M)CH_2SO_3M$, more preferably hydrogen or —$(CH_2)_qSO_3M$.

M is hydrogen or a water soluble cation in sufficient amount to satisfy charge balance. For example, a sodium cation equally satisfies —$(CH_2)_pCO_2M$, and —$(CH_2)_qSO_3M$, thereby resulting in $(CH_2)_pCO_2Na$, and —$(CH_2)_qSO_3Na$ moieties. More than one monovalent cation, (sodium, potassium, etc.) can be combined to satisfy the required chemical charge balance. However, more than one anionic group may be charge balanced by a divalent cation, or more than one mono-valent cation may be necessary to satisfy the charge requirements of a poly-anionic radical. For example, a —$(CH_2)_pPO_3M$ moiety substituted with sodium atoms has the formula —$(CH_2)_pPO_3Na_3$. Divalent cations such as calcium ($Ca^{2+}$) or magnesium ($Mg^{2+}$) may be substituted for or combined with other suitable mono-valent water soluble cations. Preferred cations are sodium and potassium, more preferred is sodium.

X is a water soluble anion such as chlorine ($Cl^-$), bromine ($Br^-$) and iodine ($I^-$) or X can be any negatively charged radical such as sulfate ($SO_4^{2-}$) and methosulfate ($CH_3SO_3^-$).

The formula indices have the following values: p has the value from 1 to 6, q has the value from 0 to 6; r has the value 0 or 1; w has the value 0 or 1, x has the value from 1 to 100; y has the value from 0 to 100; z has the value 0 or 1; m has the value from 2 to 700, preferably from 4 to 400, n has the value from 0 to 350, preferably from 0 to 200; m+n has the value of at least 5.

Preferably x has a value lying in the range of from 1 to 20, preferably from 1 to 10.

The preferred amino-functional polymers of the present invention comprise polyamine backbones wherein less than 50% of the R groups comprise "oxy" R units, preferably less than 20%, more preferably less than 5%, most preferably the R units comprise no "oxy" R units.

The most preferred amino-functional polymers which comprise no "oxy" R units comprise polyamine backbones wherein less than 50% of the R groups comprise more than 3 carbon atoms. For example, ethylene, 1,2-propylene, and 1,3-propylene comprise 3 or less carbon atoms and are the preferred "hydrocarbyl" R units. That is when backbone R units are $C_2$–$C_{12}$ alkylene, preferred is $C_2$–$C_3$ alkylene, most preferred is ethylene.

The amino-functional polymers of the present invention comprise modified homogeneous and non-homogeneous polyamine backbones, wherein 100% or less of the —NH units are modified. For the purpose of the present invention the term "homogeneous polyamine backbone" is defined as a polyamine backbone having R units that are the same (i.e., all ethylene). However, this sameness definition does not exclude polyamines that comprise other extraneous units comprising the polymer backbone which are present due to an artifact of the chosen method of chemical synthesis. For example, it is known to those skilled in the art that ethanolamine may be used as an "initiator" in the synthesis of polyethyleneimines, therefore a sample of polyethyleneimine that comprises one hydroxyethyl moiety resulting from the polymerization "initiator" would be considered to comprise a homogeneous polyamine backbone for the purposes of the present invention. A polyamine backbone comprising all ethylene R units wherein no branching Y units are present is a homogeneous backbone. A polyamine backbone comprising all ethylene R units is a homogeneous backbone regardless of the degree of branching or the number of cyclic branches present.

For the purposes of the present invention the term "non-homogeneous polymer backbone" refers to polyamine backbones that are a composite of various R unit lengths and R unit types. For example, a non-homogeneous backbone comprises R units that are a mixture of ethylene and 1,2-propylene units. For the purposes of the present invention a mixture of "hydrocarbyl" and "oxy" R units is not necessary to provide a non-homogeneous backbone.

Preferred amino-functional polymers of the present invention comprise homogeneous polyamine backbones that are totally or partially substituted by polyethyleneoxy moieties, totally or partially quaternized amines, nitrogens totally or partially oxidized to N-oxides, and mixtures thereof. However, not all backbone amine nitrogens must be modified in the same manner, the choice of modification being left to the specific needs of the formulator. The degree of ethoxylation is also determined by the specific requirements of the formulator.

The preferred polyamines that comprise the backbone of the compounds of the present invention are generally poly-alkyleneimines (PAI's), preferably polyethyleneimines (PEI's), or PEI's connected by moieties having longer R units than the parent PAI's or PEI's.

Preferred amine polymer backbones comprise R units that are $C_2$ alkylene (ethylene) units, also known as polyethylenimines (PEI's). Preferred PEI's have at least moderate branching, that is the ratio of m to n is less than 4:1, however PEI's having a ratio of m to n of 2:1 are most preferred. Preferred backbones, prior to modification have the general formula:

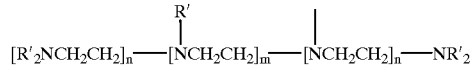

wherein R', m and n are the same as defined herein above. Preferred PEI's will have a molecular weight greater than 200 daltons.

The relative proportions of primary, secondary and tertiary amine units in the polyamine backbone, especially in the case of PEI's, will vary, depending on the manner of preparation. Each hydrogen atom attached to each nitrogen atom of the polyamine backbone chain represents a potential site for subsequent substitution, quaternization or oxidation.

These polyamines can be prepared, for example, by polymerizing ethyleneimine in the presence of a catalyst such as carbon dioxide, sodium bisulfite, sulfuric acid, hydrogen peroxide, hydrochloric acid, acetic acid, etc. Specific methods for preparing these polyamine backbones are disclosed in U.S. Pat. No. 2,182,306, Ulrich et al., issued Dec. 5, 1939; U.S. Pat. No. 3,033,746, Mayle et al., issued May 8, 1962; U.S. Pat. No. 2,208,095, Esselmann et al., issued Jul. 16, 1940; U.S. Pat. No. 2,806,839, Crowther, issued Sep. 17, 1957; and U.S. Pat. No. 2,553,696, Wilson, issued May 21, 1951; all herein incorporated by reference.

Examples of amino-functional polymers comprising PEI's, are illustrated in Formulas I—IV:

Formula I depicts an amino-functional polymer comprising a PEI backbone wherein all substitutable nitrogens are modified by replacement of hydrogen with a polyoxyalkyleneoxy unit, —$(CH_2CH_2O)H$, having the formula Formula I

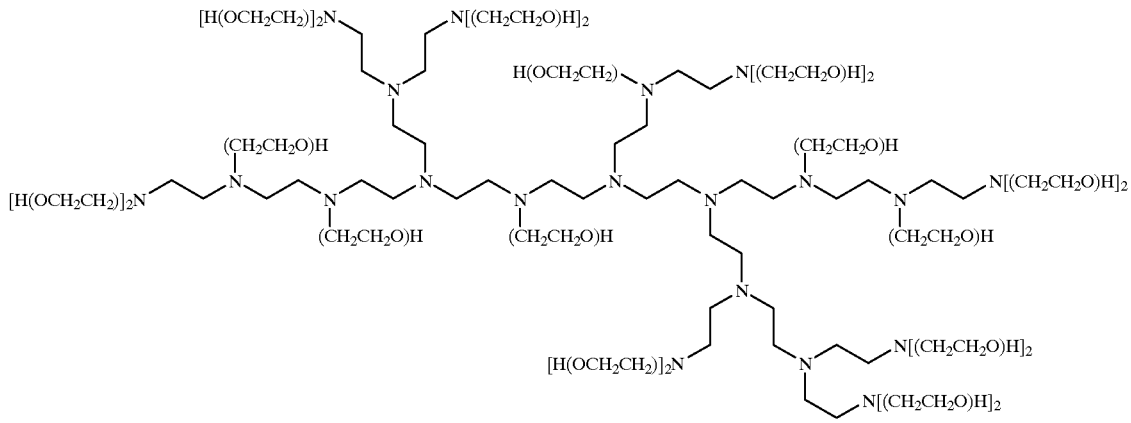

This is an example of an amino-functional polymer that is fully modified by one type of moiety.

Formula II depicts an amino-functional polymer comprising a PEI backbone wherein all substitutable primary amine nitrogens are modified by replacement of hydrogen with a polyoxyalkyleneoxy unit, —(CH$_2$CH$_2$O)$_2$H, the molecule is then modified by subsequent oxidation of all oxidizable primary and secondary nitrogens to N-oxides, said polymer having the formula Formula III depicts an amino-functional polymer comprising a PEI backbone wherein all backbone hydrogen atoms are substituted and some backbone amine units are quaternized. The substituents are polyoxyalkyleneoxy units, —(CH$_2$CH$_2$O)$_7$H, or methyl groups. The modified PEI has the formula Formula II

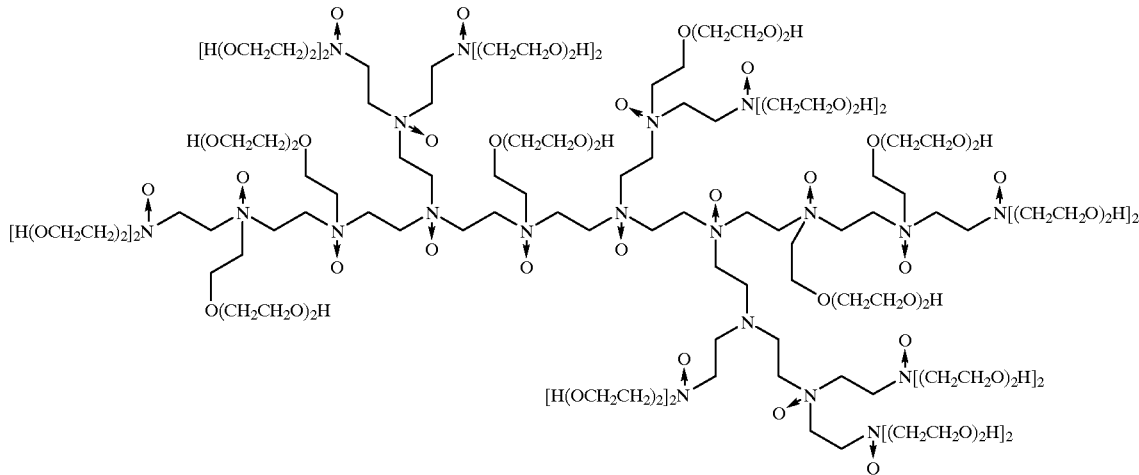

Formula III

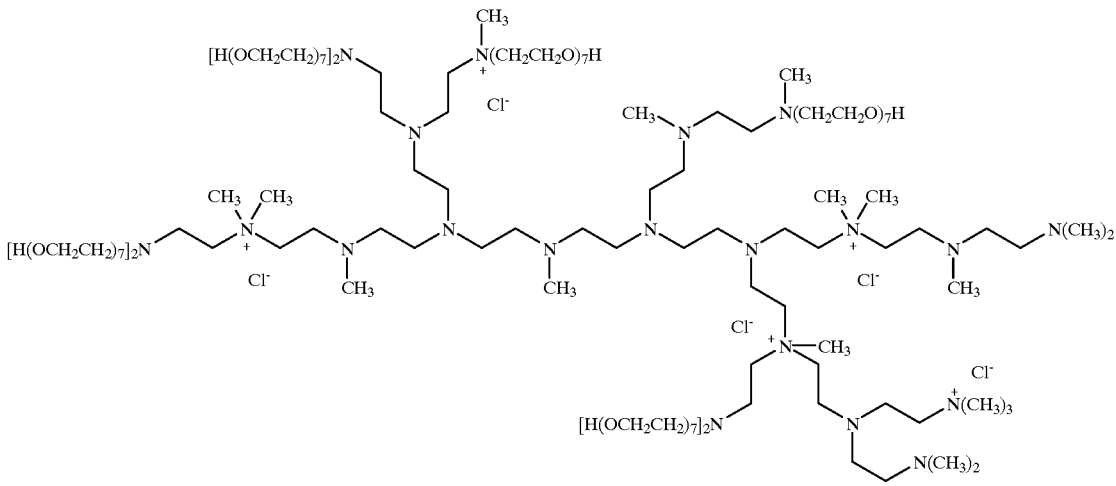

Formula IV depicts an amino-functional polymer comprising a PEI backbone wherein the backbone nitrogens are modified by substitution (i.e. by —(CH$_2$CH$_2$O)$_3$H or methyl) quaternized, oxidized to N-oxides or combinations thereof. The resulting polymer has the formula with a MW2000, and 80% hydroxyethylated poly (ethyleneimine) from Aldrich.

A typical amount of amino-functional polymer to be employed in the composition of the invention is preferably up to 90% by weight, preferably from 0.01% to 50% active Formula IV

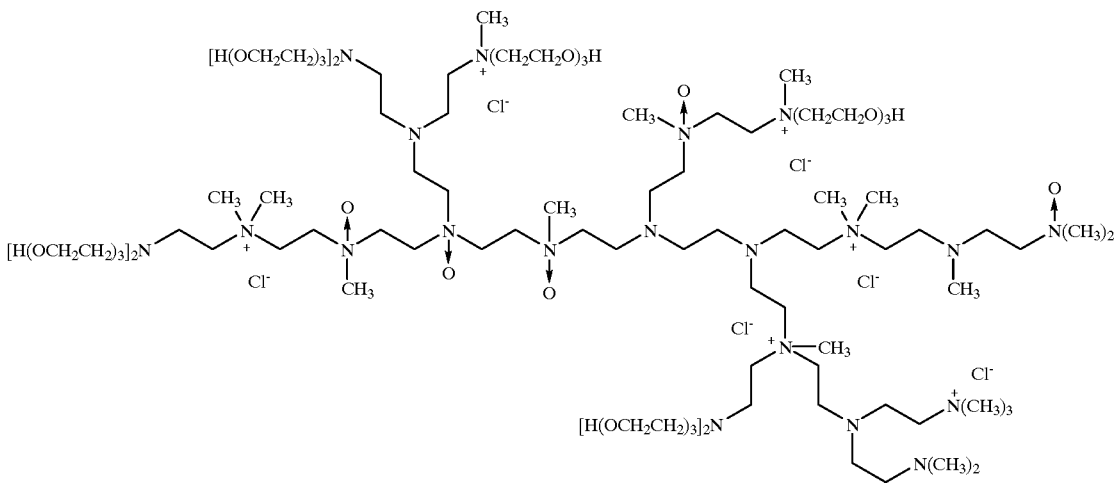

In the above examples, not all nitrogens of a unit class comprise the same modification. The present invention allows the formulator to have a portion of the secondary amine nitrogens ethoxylated while having other secondary amine nitrogens oxidized to N-oxides. This also applies to the primary amine nitrogens, in that the formulator may choose to modify ail or a portion of the primary amine nitrogens with one or more substituents prior to oxidation or quaternization. Any possible combination of R' groups can be substituted on the primary and secondary amine nitrogens, except for the restrictions described herein above.

Commercially available amino-functional polymer suitable for use herein are poly(ethyleneimine) with a MW1200, hydroxyethylated poly(ethyleneimine) from Polysciences, by weight, more preferably from 0.1% to 20% by weight and most preferably from 0.5% to 15% by weight of the composition.

Hydrophilic Perfume

The perfume selected for use herein contains ingredients with odor characteristics which are preferred in order to provide a fresh impression on the surface to which the composition is directed, i.e those which provide a fresh impression for fabrics. By the present hydrophilic perfume, a high initial perfume odor impact on fabrics is obtained.

Perfume ingredients suitable for use in the hydrophilic perfume are those selected from the group consisting of aromatic and aliphatic esters having molecular weights of from 130 to 250; aliphatic and aromatic alcohols having molecular weights of from 90 to 240; aliphatic ketones having molecular weights of from 150 to 260; aromatic ketones having molecular weights of from 150 to 270; aromatic and aliphatic lactones having molecular weights of from 130 to 290; aliphatic aldehydes having molecular weights of from 140 to 200; aromatic aldehydes having molecular weights from 90 to 230; aliphatic and aromatic ethers having molecular weights of from 150 to 270; and condensation products of aldehydes and amines having molecular weights of from 180 to 320; and essentially free from nitromusks and halogenated fragrance materials.

More preferred perfume ingredients are selected from the group consisting of:

| Common Name | Chemical Type | Chemical Name | Approx. M.W. |
|---|---|---|---|
| adoxal | aliphatic aldehyde | 2,6,10-trimethyl-9-undecen-1-al | 210 |
| allyl amyl glycolate | ester | allyl amyl glycolate | 182 |
| allyl cyclohexane propionate | ester | allyl-3-cyclohexyl propionate | 196 |
| amyl acetate | ester | 3-methyl-1-butanol acetate | 130 |
| amyl salicylate | ester | amyl salicylate | 208 |
| anisic aldehyde | aromatic aldehyde | 4-methoxy benzaldehyde | 136 |
| aurantiol | schiff base | condensation product of methyl anthranilate and hydroxycitronellal | 306 |
| bacdanol | aliphatic alcohol | 2-ethyl-4-(2,2,3-trimethyl-3-cyclopenten-1-yl)-2-buten-1-ol | 208 |
| benzaldehyde | aromatic aldehyde | benzaldehyde | 106 |
| benzophenone | aromatic ketone | benzophenone | 182 |
| benzyl acetate | ester | benzyl acetate | 150 |
| benzyl salicylate | ester | benzyl salicylate | 228 |
| beta damascone | aliphatic ketone | 1-(2,6,6-trimethyt-1-cyclo-hexen-1-yl)-2-buten-1-one | 192 |
| beta gamma hexanol | alcohol | 3-hexen-1-ol | 100 |
| buccoxime | aliphatic ketone | 1,5-dimethyl-oxime bicyclo(3,2,1)octan-8-one | 167 |
| cedrol | alcohol | octahydro-3,6,8,8-tetramethyl-1H-3A,7-methanoazulen-6-ol | 222 |
| cetalox | ether | dodecahydro-3A,6,6,9A-tetramethylnaphtho[2,1B]-furan | 236 |
| cis-3-hexenyl acetate | ester | cis-3-hexenyl acetate | 142 |
| cis-3-hexenyl salicylate | ester | beta, gamma-hexenyl salicylate | 220 |
| citronellol | alcohol | 3,7-dimethyl-6-octenol | 156 |
| citronellyl nitrite | nitrile | geranyl nitrile | 151 |
| clove stem oil | natural | | |
| coumarin | lactone | coumarin | 146 |
| cyclohexyl salicylate | ester | cyclohexyl salicylate | 220 |
| cymal | aromatic aldehyde | 2-methyl-3-(para iso propyl phenyl)propionaldehyde | 190 |
| decyl aldehyde | aliphatic aldehyde | decyl aldehyde | 156 |
| delta damascone | aliphatic ketone | 1-(2,6,6-trimethyl-3-cyclo-hexen-1-yl)-2-buten-1-one | 192 |
| dihydromyrcenol | alcohol | 3-methylene-7-methyl octan-7-ol | 156 |
| dimethyl benzyl carbinyl acetate | ester | dimethyl benzyl carbinyl acetate | 192 |
| ethyl vanillin | aromatic aldehyde | ethyl vanillin | 166 |
| ethyl-2-methyl butyrate | ester | ethyl-2-methyl butyrate | 130 |
| ethylene brassylate | macrocyclic lactone | ethylene tridecan-1,13-dioate | 270 |
| eucalyptol | aliphatic epoxide | 1,8-epoxy-para-menthane | 154 |
| eugenol | alcohol | 4-allyl-2-methoxy phenol | 164 |
| exaltolide | macrocyclic lactone | cyclopentadecanolide | 240 |
| flor acetate | ester | dihydro-nor-cyclopentadienyl acetate | 190 |
| florhydral | aromatic aldehyde | 3-(3-isopropylphenyl) butanal | 190 |
| frutene | ester | dihydro-nor-cyclopentadienyl propionate | 206 |

-continued

| Common Name | Chemical Type | Chemical Name | Approx. M.W. |
|---|---|---|---|
| galaxoxide | ether | 1,3,4,6,7,8-hexahydro-4,6,6,7,8,8-hexamethylcyclopenta-gamma-2-benzopyrane | 258 |
| gamma decalactone | lactone | 4-N-hepty-4-hydroxybutanoic acid lactone | 170 |
| gamma dodecalactone | lactone | 4-N-octyl-4-hydroxy-butanoic acid lactone | 198 |
| geraniol | alcohol | 3,7-dimethyl-2,6-octadien-1-ol | 154 |
| geranyl acetate | ester | 3,7-dimethyl-2,6-octadien-1-yl acetate | 196 |
| geranyl nitrile | ester | 3,7-diemthyl-2,6-octadienenitrile | 149 |
| helional | aromatic aldehyde | alpha-methyl-3,4,(methylenedioxy) hydrocinnamaldehyde | 192 |
| heliotropin | aromatic aldehyde | heliotropin | 150 |
| hexyl acetate | ester | hexyl acteate | 144 |
| hexyl cinnamic aldehyde | aromatic aldehyde | alpha-n-hexyl cinnamic aldehyde | 216 |
| hexyl salicylate | ester | hexyl salicylate | 222 |
| hydroxyambran | aliphatic alcohol | 2-cyclododecyl-propanol | 226 |
| hydroxycitronellal | aliphatic aldehyde | hydroxycitronellal | 172 |
| ionone alpha | aliphatic ketone | 4-(2,6,6-trimethyl-1-cyclohexenyl-1-yl)-3-buten-2-one | 192 |
| ionone beta | aliphatic ketone | 4-(2,6,6-trimethyl-1-cyclohexen-1-yl)-3-butene-2-one | 192 |
| ionone gamma methyl | aliphatic ketone | 4-(2,6,6-trimethyl-2 cyclohexyl-1-yl)-3-methyl-3-buten-2-one | 206 |
| iso E super | aliphatic ketone | 7-acetyl-1,2,3,4,5,6,7,8-octahydro-1,1,6,7,tetramethyl naphthalene | 234 |
| iso eugenol | ether | 2-methoxy-4-(1-propenyl) phenol | 164 |
| iso jasmone | aliphatic ketone | 2-methyl-3-(2-pentenyl)-2-cyclopenten-1-one | 166 |
| koavone | aliphatic aldehyde | acetyl di-isoamylene | 182 |
| lauric aldehyde | aliphatic aldehyde | lauric aldehyde | 184 |
| lavandin | natural | | |
| lavender | natural | | |
| lemon CP | natural | major component d-limonene | |
| d-limonene/orange terpenes | alkene | 1-methyl-4-iso-propenyl-1-cyclohexene | 136 |
| linalool | alcohol | 3-hydroxy-3,7-dimethyl-1,6-octadiene | 154 |
| linalyl acetate | ester | 3-hydroxy-3,7-dimethyl-1,6-octadiene acetate | 196 |
| Irg 201 | ester | 2,4-dihydroxy-3,6-dimethyl benzoic acid methyl ester | 196 |
| lyral | aliphatic aldehyde | 4-(4-hydroxy-4-methyl pentyl)3-cylcohexene-1-carboxaldehyde | 210 |
| majantol | aliphatic alcohol | 2,2-dimethyl-3-(3-methylphenyl)-propanol | 178 |
| mayol | alcohol | 4-(1-methylethyl) cyclohexane methanol | 156 |
| methyl anthranilate | aromatic amine | methyl-2-aminobenzoate | 151 |
| methyl beta naphthyl ketone | aromatic ketone | methyl beta naphthyl ketone | 170 |
| methyl cedrylone | aliphatic ketone | methyl cedrenyl ketone | 246 |
| methyl chavicol | ester | 1-methyloxy-4,2-propen-1-yl benzene | 148 |
| methyl dihydro jasmonate | aliphatic ketone | methyl dihydro jasmonate | 226 |
| methyl nonyl acetaldehyde | aliphatic aldehyde | methyl nonyl acetaldehyde | 184 |

-continued

| Common Name | Chemical Type | Chemical Name | Approx. M.W. |
|---|---|---|---|
| musk indanone | aromatic ketone | 4-acetyl-6-tert butyl-1,1-dimethyl indane | 244 |
| nerol | alcohol | 2-cis-3,7-dimethyl-2,6-octadien-1-ol | 154 |
| nonatactone | lactone | 4-hydroxynonanoic acid, lactone | 156 |
| norlimbanol | aliphatic alcohol | 1-(2,2,6-trimethyl-cyclohexyl)-3-hexanol | 226 |
| orange CP | natural | major component d-limonene | |
| P. T. bucinal | aromatic aldehyde | 2-methyl-3(para tert butylphenyl) propionaldehyde | 204 |
| para hydroxy phenyl butanone | aromatic ketone | para hydroxy phenyl butanone | 164 |
| palchouli | natural | | |
| phenyl acetaldehyde | aromatic aldehyde | 1-oxo-2-phenylethane | 120 |
| phenyl acetaldehyde dimethyl acetal | aromatic aldehyde | phenyl acetaldehyde dimethyl acetal | 166 |
| phenyl ethyl acetate | ester | phenyl ethyl acetate | 164 |
| phenyl ethyl alcohol | alcohol | phenyl ethyl alcohol | 122 |
| phenyl ethyl phenyl acetate | ester | 2-phenylethyl phenyl acetate | 240 |
| phenyl hexanol/phenoxanol | alcohol | 3-methyl-5-phenylpentanol | 178 |
| polysantol | aliphatic alcohol | 3,3-dimethyl-5-(2,2,3-trimethyl-3-cyclopenten-1-yl)-4-penten-2-ol | 221 |
| prenyl acetate | ester | 2-methylbuten-2-ol-4-acetate | 128 |
| rosaphen | aromatic alcohol | 2-methyl-5-phenyl pentanol | 178 |
| sandalwood | natural | | |
| alpha-terpinene | aliphatic alkane | 1-methyl-4-iso-propylcyclohexadiene-1,3 | 136 |
| terpineol (alpha terpineol and beta terpineol) | alcohol | para-menth-1-en-8-ol, para-menth-1-en-1-ol | 154 |
| terpinyl acetate | ester | para-menth-1-en-8-yl acetate | 196 |
| tetra hydro linalool | aliphtic alcohol | 3,7-dimethyl-3-octanol | 158 |
| tetrahydromyrcenol | aliphatic alcohol | 2,6-dimethyl-2-octanol | 158 |
| tonalid/musk plus | aromatic ketone | 7-acetyl-1,1,3,4,4,6-hexamethyl tetralin | 258 |
| undecalactone | lactone | 4-N-heptyl-4-hydroxybutanoic acid lactone | 184 |
| undecavertol | alcohol | 4-methyl-3-decen-5-ol | 170 |
| undecyl aldehyde | aliphatic aldehyde | undecanal | 170 |
| undecylenic aldehyde | aliphatic aldehyde | undecylenic aldehyde | 168 |
| vanillin | aromatic aldehyde | 4-hydroxy-3-methoxybenzaldehyde | 152 |
| verdox | ester | 2-tert-butyl cyclohexyl acetate | 198 |
| vertenex | ester | 4-tert-butyl cyclohexyl acetate | 198 | and mixtures thereof.

For the perfume to be hydrophilic, at least 25% by weight of the perfume, more preferably at least 50%, most preferably at least 75%, is composed of perfume ingredients that are hydrophilic, i.e having a Clog P of 3 or smaller as defined hereinafter.

The degree of hydrophobicity or hydrophilicity of a perfume ingredient can be correlated with its octanol/water partitioning coefficient P. The octanol/water partitioning coefficient of a perfume ingredient is the ratio between its equilibrium concentration in octanol and in water. A perfume ingredient with a greater partitioning coefficient P is more hydrophobic.

Conversely, a perfume ingredient with a smaller partitioning coefficient P is more hydrophilic. The preferred perfume ingredients of this invention have an octanol/water partitioning coefficient P of 1,000 or smaller. Since the partitioning coefficients of the perfume ingredients normally have high values, they are more conveniently given in the form of their logarithm to the base 10, logP.

The logP of many perfume ingredients has been reported; for example, in the Pomona 92 database, available from Daylight Chemical Information Systems, Inc. (Daylog CIS), Irvine, Calif., contains many, along with citations to the original literature. However, the logP values are most conveniently calculated by the "CLOG P" program, also available from Daylight CIS. This program also lists experimental logP values when they are available in the Pomona 92 database. The "calculated logP" (Clog P) is determined by the fragment approach of Hansch and Leo (cf., A. Leo, in Comprehensive Medicinal Chemistry, Vol. 4, C. Hansch, P. G. Sammens, J. B. Taylor and C. A. Ramsden, Eds., p. 295, Pergamon Press, 1990, incorporated herein by reference). The fragment approach is based on the chemical structure of each perfume ingredient, and takes into account the numbers and types of atoms, the atom connectivity, and chemical bonding. The Clog P values, which are the most reliable and widely used estimates for this physicochemical property, are used instead of the experimental logP values in the selection of perfume ingredients which are useful in the present invention.

For use herein, preferred perfume ingredients having a Clog P of about 3 or smaller are selected from the group consisting of benzaldehyde, benzyl acetate, cis-3-hexenyl acetate, coumarin, dihydromyrcenol, dimethyl benzyl carbinyl acetate, ethyl vanillin, eucalyptol, eugenol, iso eugenol, flor acetate, geraniol, hydroxycitronellal, koavone, linalool, methyl anthranilate, methyl beta naphthyl ketone, methyl dihydro jasmonate, nerol, nonalactone, phenyl ethyl acetate, phenyl ethyl alcohol, alpha terpineol, beta terpineol, vanillin, and mixtures thereof.

Preferably the composition contains an effective amount of perfume to provide the freshening fragrance to fabrics, some lingering fragrance in-wear, and some extra fragrance to be released upon fabric rewetting.

Effective level of perfume is from 0.001% to 5.0%, more preferably from 0.01% to 2.0%, most preferably from 0.015% to 0.5%, by weight of the composition.

Depending on the end use, the composition may also contain optional components which maybe suitable for further improving the aesthetic appearance of the fabrics treated therewith. Suitable optional components are selected from the group consisting of a dye fixing agent, a polyolefin dispersion, non-polymeric chlorine scavenger, a fabric softener component, enzymes, detersive ingredients, additional components and mixtures thereof.

Dye Fixing Agent

An optional component of the invention is a dye fixing agent. Dye fixing agents, or "fixatives", are well-known, commercially available materials which are designed to improve the appearance of dyed fabrics by minimizing the loss of dye from fabrics due to washing. Not included within this definition are components which are fabric softeners or those described hereinafter as amino-functional polymers.

Many dye fixing agents are cationic, and are based on various quaternized or otherwise cationically charged organic nitrogen compounds. Cationic fixatives are available under various trade names from several suppliers. Representative examples include: CROSCOLOR PMF (July 1981, Code No. 7894) and CROSCOLOR NOFF (January 1988, Code No. 8544) from Crosfield; INDOSOL E-50 (Feb. 27, 1984, Ref. No. 6008.35.84; polyethyleneamine-based) from Sandoz; SANDOFIX TPS, which is also available from Sandoz and is a preferred polycationic fixative for use herein and SANDOFIX SWE (cationic resinous compound), REWIN SRF, REWIN SRF-0 and REWIN DWR from CHT-Beitlich GMBH, Tinofix® ECO, Tinofix®FRD and Solfin® available from Ciba-Geigy.

Other cationic dye fixing agents are described in "Aftertreatments for improving the fastness of dyes on textile fibres" by Christopher C. Cook (REV. PROG. COLORATION Vol. 12, 1982). Dye fixing agents suitable for use in the present invention are ammonium compounds such as fatty acid—diamine condensates e.g. the hydrochloride, acetate, metosulphate and benzyl hydrochloride of oleyldiethyl aminoethylamide, oleylmethyldiethylenediaminemethosulphate, monostearyl-ethylene diaminotrimethylammonium methosulphate and oxidized products of tertiary amines; derivatives of polymeric alkyldiamines, polyamine-cyanuric chloride condensates and aminated glycerol dichlorohydrins.

A typical amount of the dye fixing agent to be employed in the composition of the invention is preferably up 90% by weight, preferably up to 50% by weight, more preferably from 0.001% to 10% by weight, most preferably from 0.5% to 5% active by weight of the composition.

Polyolefin Dispersion

A polyolefin dispersion may optionally be used in the composition of the invention in order to provide antiwrinkles and improved water absorbency benefits to the fabrics. Preferably, the polyolefin is a polyethylene, polypropylene or mixtures thereof. The polyolefin may be at least partially modified to contain various functional groups, such as carboxyl, carbonyl, ester, ether, alkylamide, sulfonic acid or amide groups. More preferably, the polyolefin employed in the present invention is at least partially carboxyl modified or, in other words, oxidized. In particular, oxidized or carboxyl modified polyethylene is preferred in the compositions of the present invention.

For ease of formulation, the polyolefin is preferably introduced as a suspension or an emulsion o f polyolefin dispersed by use of an emulsifing agent. The polyolefin suspension or emulsion preferably has from 1 to 50%, more preferably from 10 to 35% by weight, and most preferably from 15 to 30% by weight of polyolefin in the emulsion. The polyolefin preferably has a molecular weight of from 1,000 to 15,000 and more preferably from 4,000 to 10,000.

When an emulsion is employed, the emulsifier may be any suitable emulsification or suspending agent. Preferably, the emulsifier is a cationic, nonionic, zwitterionic or anionic surfactant or mixtures thereof. Most preferably, any suitable cationic, nonionic or anionic surfactant may be employed as the emulsifier. Preferred emulsifiers are cationic surfactants such as the fatty amine surfactants and in particular the ethoxylated fatty amine surfactants. In particular, the cationic surfactants are preferred as emulsifiers in the present invention. The polyolefin is dispersed with the emulsifier or suspending agent in a ratio of emulsifier to polyolefin of from 1:10 to 3:1. Preferably, the emulsion includes from 0.1 to 50%, more preferably from 1 to 20% and most preferably from 2.5 to 10% by weight of emulsifier in the polyolefin emulsion. Polyethylene emulsions and suspensions suitable for use in the present invention are available under the tradename VELUSTROL from HOECHST Aktiengesellschaft of Frankfurt am Main, Germany. In particular, the polyethylene emulsions sold under the tradename VELUSTROL PKS, VELUSTROL KPA, or VELUSTROL P-40 may be employed in the compositions of the present invention.

When present, the compositions of the present invention will contain from 0.01% to 8% by weight of the dispersible polyolefin, more preferably from 0.1% to 5% by weight and most preferably from 0.1% to 3% by weight of the polyolefin. When the polyolefin is added to the compositions of the present invention as an emulsion or suspension, the emulsion or suspension is added at sufficient enough quantities to provide the above noted levels of dispersible polyolefin in the compositions.

Non-polymeric Chlorine Scavengers

A non-polymeric chlorine scavenger is another optional component of the invention.

Suitable levels of chlorine scavengers in the compositions of the present invention may range from 0.01% to 15%, preferably from 0.02% to 10%, most preferably from 0.25% to 5%, by weight of total composition. If both the cation and the anion of the scavenger react with chlorine, which is desirable, the level may be adjusted to react with an equivalent amount of available chlorine.

The chlorine Scavengers for use herein are selected from the group consisting of non-polymeric ammonium salts. Suitable non-polymeric ammonium salts for use herein have the general formula:

[R²N+R₃]X— wherein the $R^2$ group is a $C_1$–$C_9$ alkyl or substituted (e.g., hydroxy) alkyl, or hydrogen, preferably hydrogen.

Each R is a $C_1$–$C_4$ alkyl or substituted (e.g., hydroxy) alkyl, or hydrogen, preferably methyl or hydrogen, more preferably hydrogen, and the counterion $X^-$ is a compatible anion, for example, chloride, bromide, citrate, sulfate, etc, preferably chloride.

Most preferred examples of non-polymeric ammonium salts are selected from ammonium chloride, ammonium sulfate; and mixtures thereof. Ammonium chloride is a preferred inexpensive chlorine scavenger for use herein.

Fabric Softener Component

Optionally, a fabric softener component may also be suitably used in the composition of the invention so as to provide softness and antistastic properties to the treated fabrics. When used, the fabric softener component will typically be present at a level sufficient to provide softening and antistatic properties. Typical levels are those conventionally used in fabric softening compositions, i.e from 1% to 99% by weight of the composition. Depending on the composition execution, i.e liquid or solid, the composition will preferably comprise a level of fabric softening components for liquid compositions of from 1% to 5% by weight for the diluted compositions or from 5% to 80%, more preferably 10% to 50%, most preferably 15% to 35% by weight for concentrated compositions. Where nonionic fabric softener components are present, the level of nonionic softener component in the composition will typically be from 0.1% to 10%, preferably from 1% to 5% by weight.

Where the composition comprising the softener component is applied on a substrate such as a dryer-sheet, the preferred level of fabric softener component will preferably be from 20% to 99%, more preferably from 30% to 90% by weight, and even more preferably from 35% to 85% by weight.

Said fabric softening component may be selected from cationic, nonionic, amphoteric or anionic fabric softening component.

The preferred, typical cationic fabric softening components include the water-insoluble quaternary-ammonium fabric softening actives, the most commonly used having been di-long alkyl chain ammonium chloride or methyl sulfate.

Preferred cationic softeners among these include the following:

1) ditallowyl dimethylammonium chloride (DTDMAC);
2) dihydrogenated tallow dimethylammonium chloride;
3) dihydrogenated tallow dimethylammonium methylsulfate;
4) distearyl dimethylammonium chloride;
5) dioleyl dimethylammonium chloride;
6) dipalmityl hydroxyethyl methylammonium chloride;
7) stearyl benzyl dimethylammonium chloride;
8) hydrogenated tallow trimethylammonium chloride;
9) $C_{12}$–$_{18}$ alkyl dihydroxyethyl methylammonium chloride;
10) ditallow imidazolinium methylsulfate;
11) 1-(2-tallowylamidoethyl)-2-tallowyl imidazolinium methylsulfate.

However, in recent years, the need has arisen for more environmentally-friendly materials, and rapidly biodegradable quaternary ammonium compounds have been presented as alternatives to the traditionally used di-long alkyl chain ammonium chlorides and methyl sulfates. Said materials and fabric softening compositions containing them are disclosed in numerous publications such as EP-A-0,040,562, and EP-A-0,239,910.

The quaternary ammonium compounds and amine precursors herein have the formula (I) or (II), below:

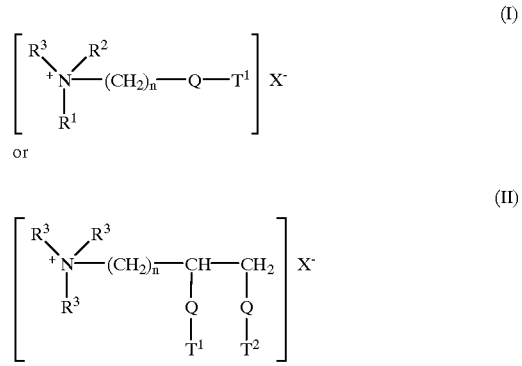

wherein Q is selected from —O—C(O)—, —C(O)—O—, —O—C(O)—O—, —NR⁴—C(O)—, —C(O)—NR⁴—;

$R^1$ is $(CH_2)n$—Q—$T^2$ or $T^3$;
$R^2$ is $(CH_2)m$—Q—$T^4$ or $T^5$ or $R^3$;
$R^3$ is $C_1$–$C_4$ alkyl or $C_1$–$C_4$ hydroxyalkyl or H;
$R^4$ is H or $C_1$–$C_4$ alkyl or $C_1$–$C_4$ hydroxyalkyl;
$T^1$, $T^2$, $T^3$, $T^4$, $T^5$ are independently $C_6$–$C_{22}$ alkyl or alkenyl;
n and m are integers from 1 to 4; and
$X^-$ is a softener-compatible anion.

Non-limiting examples of softener-compatible anions include chloride or methyl sulfate.

The alkyl, or alkenyl, chain $T^1$, $T^2$, $T^3$, $T^4$, $T^5$ must contain at least 6 carbon atoms, preferably at least 11 carbon atoms, more preferably at least 16 carbon atoms. The chain may be straight or branched.

Tallow is a convenient and inexpensive source of long chain alkyl and alkenyl material. The compounds wherein $T^1$, $T^2$, $T^3$, $T^4$, $T^5$ represents the mixture of long chain materials typical for tallow are particularly preferred.

Specific examples of quaternary ammonium compounds suitable for use in the aqueous fabric softening compositions herein include:

1) N,N-di(tallowoyl-oxy-ethyl)-N,N-dimethyl ammonium chloride;
2) N,N-di(tallowoyl-oxy-ethyl)-N-methyl, N-(2-hydroxyethyl) ammonium methyl sulfate;
3) N,N-di(tallowyl-oxy-2-oxo-ethyl)-N,N-dimethyl ammonium chloride;
4) N,N-di(tallowyl-oxy-ethylcarbonyl-oxy-ethyl)-N,N-dimethyl ammonium chloride;
5) N-(tallowoyl-oxy-2-ethyl)-N-(tallowyl-oxy-2-oxo-ethyl)-N,N-dimethyl ammonium chloride;
6) N,N,N-tri(tallowoyl-oxy-ethyl)-N-methyl ammonium chloride;
7) N-(tallowyl-oxy-2-oxo-ethyl)-N-tallowyl-N,N-dimethyl-ammonium chloride; and 8) 1,2-ditallowoyl-oxy-3-trimethylammoniopropane chloride;

9) di(stearoyloxyethyl) dimethylammonium chloride (DSOEDMAC); and mixtures of any of the above materials.

Of these, compounds 1–7 are examples of compounds of Formula (I); compound 8 is a compound of Formula (II).

Particularly preferred is N,N-di(tallowoyl-oxy-ethyl)-N, N-dimethyl ammonium chloride, where the tallow chains are at least partially unsaturated.

The level of unsaturation of the fatty chain can be measured by the Iodine Value (IV) of the corresponding fatty acid, which in the present case should preferably be in the range of from 5 to 200, preferably 5 to 150, and more preferably 5 to 100 with two categories of compounds being distinguished, having a IV below or above 25.

Indeed, for compounds of Formula (I) made from tallow fatty acids having a IV of from 5 to 25, preferably 15 to 20, it has been found that a cis/trans isomer weight ratio greater than 30/70, preferably greater than 50/50 and more preferably greater than 70/30 provides optimal concentrability.

For compounds of Formula (I) made from tallow fatty acids having a IV of above 25, the ratio of cis to trans isomers has been found to be less critical unless very high concentrations are needed.

Other examples of suitable quaternary ammoniums of Formula (I) and (II) are obtained by, e.g.

replacing "tallow" in the above compounds with, for example, coco, palm, lauryl, oleyl, ricinoleyl, stearyl, palmityl, or the like, said fatty acyl chains being either fully saturated, or preferably at least partly unsaturated;

replacing "methyl" in the above compounds with ethyl, ethoxy, propyl, propoxy, isopropyl, butyl, isobutyl or t-butyl;

replacing "chloride" in the above compounds with bromide, methylsulfate, formate, sulfate, nitrate, and the like.

In fact, the anion is merely present as a counterion of the positively charged quaternary ammonium compounds. The nature of the counterion is not critical at all to the practice of the present invention. The scope of this invention is not considered limited to any particular anion.

By "amine precursors thereof" is meant the secondary or tertiary amines corresponding to the above quaternary ammonium compounds, said amines being substantially protonated in the present compositions due to the pH values.

Additional fabric softening materials may be used in addition or alternatively to the cationic fabric softener. These may be selected from nonionic, amphoteric or anionic fabric softening material. Disclosure of such materials may be found in U.S. Pat. No. 4,327,133; U.S. Pat. No. 4,421,792; U.S. Pat. No. 4,426,299; U.S. Pat. No. 4,460,485; U.S. Pat. No. 3,644,203; U.S. Pat. No. 4,661,269; U.S. Pat. No. 4,439,335; U.S. Pat. No. 3,861,870; U.S. Pat. No. 4,308,151; U.S. Pat. No. 3,886,075; U.S. Pat. No. 4,233,164; U.S. Pat. No. 4,401,578; U.S. Pat. No. 3,974,076; U.S. Pat. No. 4,237,016 and EP 472,178.

Typically, such nonionic fabric softener materials have a HLB of from 2 to 9, more typically from 3 to 7. Such nonionic fabric softener materials tend to be readily dispersed either by themselves, or when combined with other materials such as single-long-chain alkyl cationic surfactant described in detail hereinafter. Dispersibility can be improved by using more single-long-chain alkyl cationic surfactant, Mixture with other materials as set forth hereinafter, use of hotter water, and/or more agitation. In general, the materials selected should be relatively crystalline, higher melting, (e.g. >40° C.) and relatively water-insoluble.

Preferred nonionic softeners are fatty acid partial esters of polyhydric alcohols, or anhydrides thereof, wherein the alcohol, or anhydride, contains from 2 to 18, preferably from 2 to 8, carbon atoms, and each fatty acid moiety contains from 12 to 30, preferably from 16 to 20, carbon atoms. Typically, such softeners contain from one to 3, preferably 2 fatty acid groups per molecule.

The polyhydric alcohol portion of the ester can be ethylene glycol, glycerol, poly (e.g., di-, tri-, tetra, penta-, and/or hexa-) glycerol, xylitol, sucrose, erythritol, pentaerythritol, sorbitol or sorbitan. Sorbitan esters and polyglycerol monostearate are particularly preferred.

The fatty acid portion of the ester is normally derived from fatty acids having from 12 to 30, preferably from 16 to 20, carbon atoms, typical examples of said fatty acids being lauric acid, myristic acid, palmitic acid, stearic acid and behenic acid.

Highly preferred optional nonionic softening agents for use in the present invention are the sorbitan esters, which are esterified dehydration products of sorbitol, and the glycerol esters.

Commercial sorbitan monostearate is a suitable material. Mixtures of sorbitan stearate and sorbitan palmitate having stearate/palmitate weight ratios varying between 10:1 and 1:10, and 1,5-sorbitan esters are also useful.

Glycerol and polyglycerol esters, especially glycerol, diglycerol, triglycerol, and polyglycerol mono- and/or di-esters, preferably mono-, are preferred herein (e.g. polyglycerol monostearate with a trade name of Radiasurf 7248).

Useful glycerol and polyglycerol esters include monoesters with stearic, oleic, palmitic, lauric, isostearic, myristic, and/or behenic acids and the diesters of stearic, oleic, palmitic, lauric, isostearic, behenic, and/or myristic acids. It is understood that the typical mono-ester contains some di- and tri-ester, etc.

The "glycerol esters" also include the polyglycerol, e.g., diglycerol through octaglycerol esters. The polyglycerol polyols are formed by condensing glycerin or epichlorohydrin together to link the glycerol moieties via ether linkages. The mono- and/or diesters of the polyglycerol polyols are preferred, the fatty acyl groups typically being those described hereinbefore for the sorbitan and glycerol esters.

For the preceding fabric softening agents, especially with biodegradable fabric softening agents, the pH of the liquid compositions herein is an essential parameter of the present invention. Indeed, it influences the stability of the quaternary ammonium or amine precursors compounds, especially in prolonged storage conditions. The pH, as defined in the present context, is measured in the neat compositions at 20° C. For optimum hydrolytic stability of the se compositions, the neat pH, measured in the above-mentioned conditions, must be in the range of from 2.0 to 4.5. Preferably, where the liquid fabric softening compositions of the invention are in a concentrated form, the pH of the neat composition is in the range of 2.0 to 3.5, while if it is in a diluted form, the pH of the neat composition is in the range of 2.0 to 3.0. The pH of these compositions herein can be regulated by the addition of a Bronsted acid.

Examples of suitable acids include the inorganic mineral acids, carboxylic acids, in particular the low molecular weight ($C_1$–$C_5$) carboxylic acids, and alkylsulfonic acids. Suitable inorganic acids include HCl, $H_2SO_4$, $HNO_3$ and $H_3PO_4$. Suitable organic acids include formic, acetic, citric, methylsulfonic and ethylsulfonic acid. Preferred acids are citric, hydrochloric, phosphoric, formic, methylsulfonic acid, and benzoic acids.

Enzymes

The composition herein can optionally employ one or more enzymes such as lipases, proteases, cellulase, amylases and peroxidases. A preferred enzyme for use herein is a cellulase enzyme. Indeed, this type of enzyme will further provide a color care benefit to the treated fabric. Cellulases usable herein include both bacterial and fungal types, preferably having a pH optimum between 5 and 9.5. U.S. Pat. No. 4,435,307, Barbesgoard et al, Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, *Dolabella Auricula Solander*. Suitable cellulases are also disclosed in GB-A-2.075.028; GB-A-2.095.275 and DE-OS-2.247.832. CAREZYME® and CELLUZYME® (Novo) are especially useful. Other suitable cellulases are also disclosed in WO 91/17243 to Novo, WO 96/34092, WO 96/34945 and EP-A-0,739,982.

In practical terms for current commercial preparations, typical amounts are up to about 5 mg by weight, more typically 0.01 mg to 3 mg, of active enzyme per gram of the composition. Stated otherwise, the compositions herein will typically comprise from 0.001% to 5%, preferably 0.01%–1% by weight of a commercial enzyme preparation. In the particular cases where activity of the enzyme preparation can be defined otherwise such as with cellulases, corresponding activity units are preferred (e.g. CEVU or cellulase Equivalent Viscosity Units). For instance, the compositions of the present invention can contain cellulase enzymes at a level equivalent to an activity from about 0.5 to 1000 CEVU/gram of composition. Cellulase enzyme preparations used for the purpose of formulating the compositions of this invention typically have an activity comprised between 1,000 and 10,000 CEVU/gram in liquid form, around 1,000 CEVU/gram in solid form.

Fully formulated fabric softening compositions preferably contain, in addition to the hereinbefore described components, one or more of the following ingredients.

Concentrated compositions of the present invention may require organic and/or inorganic concentration aids to go to even higher concentrations and/or to meet higher stability standards depending on the other ingredients. Surfactant concentration aids are typically selected from the group consisting of single long chain alkyl cationic surfactants; nonionic surfactants; amine oxides; fatty acids; or mixtures thereof, typically used at a level of from 0 to 15% of the composition.

Inorganic viscosity control agents which can also act like or augment the effect of the surfactant concentration aids, include water-soluble, ionizable salts which can also optionally be incorporated into the compositions of the present invention. A wide variety of ionizable salts can be used. Examples of suitable salts are the halides of the Group IA and IIA metals of the Periodic Table of the Elements, e.g., calcium chloride, magnesium chloride, sodium chloride, potassium bromide, and lithium chloride. The ionizable salts are particularly useful during the process of mixing the ingredients to make the compositions herein, and later to obtain the desired viscosity. The amount of ionizable salts used depends on the amount of active ingredients used in the compositions and can be adjusted according to the desires of the formulator. Typical levels of salts used to control the composition viscosity are from 20 to 20,000 parts per million (ppm), preferably from 20 to 11,000 ppm, by weight of the composition.

Alkylene polyammonium salts can be incorporated into the composition to give viscosity control in addition to or in place of the water-soluble, ionizable salts above. In addition, these agents can act as scavengers, forming ion pairs with anionic detergent carried over from the main wash, in the rinse, and on the fabrics, and may improve softness performance. These agents may stabilize the viscosity over a broader range of temperature, especially at low temperatures, compared to the inorganic electrolytes.

Specific examples of alkylene polyammonium salts include I-lysine monohydrochloride and 1,5-diammonium 2-methyl pentane dihydrochloride.

Another optional, but preferred, ingredient is a liquid carrier. The liquid carrier employed in the instant compositions is preferably at least primarily water due to its low cost, relative availability, safety, and environmental compatibility. The level of water in the liquid carrier is preferably at least 50%, most preferably at least 60%, by weight of the carrier. Mixtures of water and low molecular weight, e.g., <200, organic solvent, e.g., lower alcohols such as ethanol, propanol, isopropanol or butanol are useful as the carrier liquid. Low molecular weight alcohols include monohydric, dihydric (glycol, etc.) trihydric (glycerol, etc.), and higher polyhydric (polyols) alcohols.

Still other optional ingredients are Soil Release Polymers, bacteriocides, colorants, perfumes, preservatives, optical brighteners, anti ionisation agents, antifoam agents, and the like.

Various other optional adjunct ingredients may also be used to provide fully-formulated detergent compositions. The following ingredients are described for the convenience of the formulator, but are not intended to be limiting thereof.

Detersive Ingredient

Detersive ingredients may also be used in the composition of the invention. Suitable detersive ingredients are those conventional to the detergent formulators of laundry and cleaning products. Typical of such conventional detersive ingredients include detersive surfactants, builders, bleaching compounds, and mixtures thereof.

Detersive Surfactants

Nonlimiting examples of surfactants useful herein typically at levels from 1% to 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)$ $CH_3$ and $CH_3(CH_2)_y$ $(CHOSO_3^{-M+})$ $CH_2CH_3$ where x and (y+1) are integers of at least 7, preferably at least 9, and M is a water-solubilizing cation, especially sodium, unsaturated sulfates such as oleyl sulfate, the $C_{10}$–$C_{18}$ alkyl alkoxy sulfates ("$AE_xS$"; especially x up to 7 EO ethoxy sulfates), $C_{10}$–$C_{18}$ alkyl alkoxy carboxylates (especially the EO 1-5 ethoxycarboxylates), the $C_{10}$–$C_{18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, cationic surfactants and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

Builders

Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least 1% builder, preferably from 1% to 80%. Liquid formulations typically comprise from 5% to 50%, more typically 5% to 30%, by weight, of detergent builder. Granular formulations typically comprise from 1% to 80%, more typically from 5% to 50% by weight, of the detergent builder. Lower or higher levels of builder, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2$:$Na_2O$ ratio in the range 1.0:1 to 3.2:1 and layered silicates, such as the layered sodium silicates described in U.S. Pat. No. 4,664,839. NaSKS-6 is the trademark for a crystalline layered silicate marketed by Hoechst (commonly abbreviated herein as "SKS-6"). Unlike zeolite builders, the Na SKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1} \cdot yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_{z/n}[(AlO_2)_z(SiO_2)_y] \cdot xH_2O$$

wherein z and y are integers usually of at least 6, the molar ratio of z to y is in the range from 1.0 to 0, and x is an integer from 0 to 264, and M is a Group IA or IIA element, e.g., Na, K, Mg, Ca with valence n. Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

$$Na_{12}[(AlO_2)_{12}(SiO_2)_{12}] \cdot xH_2O$$

wherein x is from 20 to 30, especially 27. This material is known as Zeolite A. Dehydrated zeolites (x=0–10) may also be used herein. Preferably, the aluminosilicate has a particle size of 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1, 3, 5-trihydroxy benzene-2, 4, 6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, pyromellitic, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristytsuccinate, palmitylsuccinate, 2-dodecenylsuccinate (preferred), 2 pentadecenylsuccinate, and the like. Laurylsuccinates are the preferred builders of this group, and are described in EP 0,200,263.

Other suitable polycarboxylates are disclosed in U.S. Pat. No. 4,144,226 and in U.S. Pat. No. 3,308,067. See also U.S. Pat. No. 3,723,322.

Fatty acids, e.g., $C_{12}$–$C_{18}$ monocarboxylic acids such as oleic acid and/or its salts, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Bleaching Compounds—Bleaching Agents and Bleach Activators

The detergent compositions herein may optionally contain bleaching agents or bleaching compositions containing a bleaching agent and one or more bleach activators. When present, bleaching agents will typically be at levels of from 1% to 30%, more typically from 5% to 20%, of the detergent composition, especially for fabric laundering. If present, the amount of bleach activators will typically be from 0.1% to 60%, more typically from 0.5% to 40% of the bleaching composition comprising the bleaching agent-plus-bleach activator.

The bleaching agents used herein can be any of the bleaching agents useful for detergent compositions in textile cleaning or other cleaning purposes that are now known or become known. These include oxygen bleaches as well as other bleaching agents. Perborate bleaches, e.g., sodium perborate (e.g., mono- or tetra-hydrate) can be used herein.

Another category of bleaching agent that can be used without restriction encompasses percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, U.S. 740,446, EP 0,133,354, and U.S. Pat. No. 4,412,934. Highly preferred bleaching agents also include 6-nonylamino-6-oxoperoxycaproic acid as described in U.S. Pat. No. 4,634,551.

Peroxygen bleaching agents can also be used. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from 500 micrometers to 1,000 micrometers, not more than 10% by weight of said particles being smaller than 200 micrometers and not more than 10% by weight of said particles being larger than 1,250 micrometers. Optionally, the percarbonate can be coated with silicate, borate or water-soluble surfactants. Percarbonate is available from various commercial sources such as FMC, Solvay and Tokai Denka.

Mixtures of bleaching agents can also be used.

Peroxygen bleaching agents, the perborates, the percarbonates, etc., are preferably combined with bleach activators, which lead to the in situ production in aqueous solution (i.e., during the washing process) of the peroxy acid corresponding to the bleach activator. Various nonlimiting examples of activators are disclosed in U.S. Pat. No. 4,915,854, and U.S. Pat. No. 4,412,934. The nonanoyloxybenzene sulfonate (NOBS), 3,5,5-tri-methyl hexanoyl oxybenzene sulfonate (ISONOBS) and tetraacetyl ethylene diamine (TAED) activators are typical, and mixtures thereof can also be used. See also U.S. Pat. No. 4,634,551 for other typical bleaches and activators useful herein.

Highly preferred amido-derived bleach activators are those of the formulae:

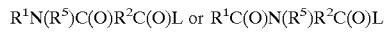

$$R^1N(R^5)C(O)R^2C(O)L \text{ or } R^1C(O)N(R^5)R^2C(O)L$$

wherein $R^1$ is an alkyl group containing from 6 to 12 carbon atoms, $R^2$ is an alkylene containing from 1 to 6 carbon atoms, $R^5$ is H or alkyl, aryl, or alkaryl containing from 1 to 10 carbon atoms, and L is any suitable leaving group. A leaving group is any group that is displaced from the bleach activator as a consequence of the nucleophilic attack on the bleach activator by the perhydrolysis anion. A preferred leaving group is phenyl sulfonate.

Preferred examples of bleach activators of the above formulae include (6-octanamido-caproyl) oxybenzenesulfonate, (6-nonanamidocaproyl)-oxybenzenesulfonate, (6-decanamido-caproyl) oxybenzenesulfonate, and mixtures thereof as described in U.S. Pat. No. 4,634,551, incorporated herein by reference.

Another class of bleach activators comprises the benzoxazin-type activators disclosed by Hodge et al in U.S. Pat. No. 4,966,723. A highly preferred activator of the benzoxazin-type is:

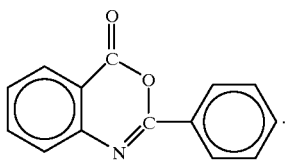

Still another class of preferred bleach activators includes the acyl lactam activators, especially acyl caprolactams and acyl valerolactams of the formulae:

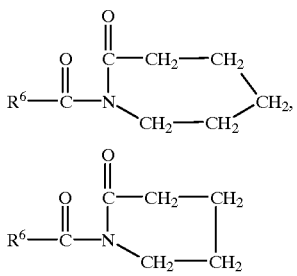

wherein $R^6$ is H or an alkyl, aryl, alkoxyaryl, or alkaryl group containing from 1 to 12 carbon atoms. Highly preferred lactam activators include benzoyl caprolactam, octanoyl caprolactam, 3,5,5-trimethylhexanoyl caprolactam, nonanoyl caprolactam, decanoyl caprolactam, undecenoyl caprolactam, benzoyl valerolactam, octanoyl valerolactam, decanoyl valerolactam, undecenoyl valerolactam, nonanoyl valerolactam, 3,5,5-trimethylhexanoyl valerolactam and mixtures thereof. See also U.S. Pat. No. 4,545,784, issued to Sanderson, Oct. 8, 1985, incorporated herein by reference, which discloses acyl caprolactams, including benzoyl caprolactam, adsorbed into sodium perborate.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. See U.S. Pat. No. 4,033,718, issued Jul. 5, 1977 to Holcombe et al. If used, detergent compositions will typically contain from 0.025% to 1.25%, by weight, of such bleaches, especially sulfonate zinc phthalocyanine.

If desired, the bleaching compounds can be catalyzed by means of a manganese compound. Such compounds are well known in the art and include, for example, the manganese-based catalysts disclosed in U.S. Pat. No. 5,246,621, U.S. Pat. No. 5,244,594; U.S. Pat. No. 5,194,416; U.S. Pat. No. 5,114,606; and EP 549,271A1, 549,272A1, 544,440A2, and 544,490A1; Preferred examples of these catalysts include $Mn^{IV}{}_2(u\text{-}O)_3(1,4,7\text{-trimethyl-}1,4,7\text{-triazacyclononane})_2 (PF_6)_2$, $Mn^{III}{}_2(u\text{-}O)_1(u\text{-}OAc)_2(1,4,7\text{-trimethyl-}1,4,7\text{-triazacyclononane})_2\text{-}(ClO_4)_2$, $Mn^{IV}{}_4(u\text{-}O)_6(1,4,7\text{-triazacyclononane})_4(ClO_4)_4$, $Mn^{III}Mn^{IV}{}_4(u\text{-}O)_1(u\text{-}OAc)_2\text{-}(1,4,7\text{-trimethyl-}1,4,7\text{-triazacyclononane})_2(ClO_4)_3$, $Mn^{IV}(1,4,7\text{-trimethyl-}1,4,7\text{-triazacyclononane})\text{-}(OCH_3)_3(PF_6)$, and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos. 4,728,455; 5,284,944; 5,246,612; 5,256,779; 5,280,117; 5,274,147; 5,153,161; and 5,227,084.

As a practical matter, and not by way of limitation, the compositions and processes herein can be adjusted to provide on the order of at least one part per ten million of the active bleach catalyst species in the aqueous washing liquor, and will preferably provide from 0.1 ppm to 700 ppm, more preferably from 1 ppm to 500 ppm, of the catalyst species in the laundry liquor.

Other preferred optional ingredients include enzymes such as lipases, proteases, amylases and peroxidases, enzyme stabilisers, polymeric soil release agents, materials effective for inhibiting the transfer of dyes from one fabric to another during the cleaning process (i.e., dye transfer inhibiting agents), polymeric dispersing agents, suds suppressors, optical brighteners or other brightening or whitening agents, chelating agents, fabric softening clay, anti-static agents, other active ingredients, carriers, hydrotropes, processing aids, dyes or pigments, solvents for liquid formulations and solid fillers for bar compositions.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to 6 carbon atoms and from 2 to 6 hydroxy groups (e.g., 1,3-propanediol, ethylene glycol, glycerine, and 1,2-propanediol) can also be used. The compositions may contain from 5% to 90%, typically 10% to 50% of such carriers.

Granular detergents can be prepared, for example, by spray-drying (final product density 520 g/l) or agglomerating (final product density above 600 g/l) the Base Granule. The remaining dry ingredients can then be admixed in granular or powder form with the Base Granule, for example in a rotary mixing drum, and the liquid ingredients (e.g., nonionic surfactant and perfume) can be sprayed on.

The detergent compositions herein will preferably be formulated such that, during use in aqueous cleaning operations, the wash water will have a pH of between 6.5 and 1 1, preferably between 7.5 and 10.5. Laundry products are typically at pH 9–11. Techniques for controlling pH at recommended usage levels include the use of buffers, alkalis, acids, etc., and are well known to those skilled in the art.

Method

In another aspect of the invention, there is provided a method for providing color care and perfume substantivity on fabrics upon domestic treatment which comprises the step of contacting the fabrics with an aqueous medium comprising a composition as defined hereinbefore. Preferably, said aqueous medium is at a temperature between 2 to 40° C., more preferably between 5 to 25° C.

In a further aspect of the invention, the composition of the invention may be applied on a substrate, such as a dryer-sheet. Accordingly, there is also provided a method for providing color care and perfume substantivity on fabrics upon domestic treatment which comprises the step of contacting the fabrics with a composition as defined hereinbefore, wherein said composition is applied on a substrate, preferably a dryer-sheet. Preferably, where the composition of the invention is applied on a dryer-sheet, the compositions are used in tumble-drying processes.

By "effective perfume substantivity on the fabric", it is meant that the fabrics which are contacted with a composition of the invention exhibit a better or equal perfume substantivity on the fabric compared to compositions which comprise the hydrophilic perfume but not the amino-functional polymer.

The benefit of perfume substantivity on the treated fabric may be assessed by evaluating the intensity of the perfume on wet and dry fabrics. The method is carried out by a panel of 6 expert judges, trained to use sensory evaluations. In this instance, expert is defined as a person having at least 6 months training with demonstrated evidence of olfactive sensitivity. The data obtained using the perfumers intensity scale are then averaged to give a consensus value for the perceived intensity of perfume.

The perfumers intensity scale is as follows:

0—no perfume,
25—slight perfume,
50—moderate perfume,

75—very strong perfume, and

100—extremely strong perfume

By "color care", it is meant that fabrics which have been in contact with a composition of the invention, as defined hereinbefore, and which after, and/or prior and/or simultaneously washed with a detergent composition exhibit a better fabric color appearance compared to fabrics which have not been contacted with said composition.

The color care benefit may either be assessed visually or by determination of the so-called delta-E values.

When the visual assessment is used, a panel of expert graders visually compare, according to the established panel score unit (PSU) scales, fabrics treated with and without the composition according to the present invention. A positive PSU value indicates a better performance (PSU scale: 0=no difference, 1=I think there is a difference, 2=I know there is a difference, 3=I know there is a lot of difference, 4=I know there is a whole lot of difference).

Another method for the assessment of the color care benefit to fabrics is the determination of the so-called delta-E values. Delta E's are defined, for instance, in ASTM D2244. Delta E is the computed color difference as defined in ASTM D2244, i.e the magnitude and direction of the difference between two psychophysical color stimuli defined by tristimulus values, or by chromaticity coordinates and luminance factor, as computed by means of a specified set of color-difference equations defined in the CIE 1976 CIELAB opponent-color space, the Hunter opponent-color space, the Friele-Mac Adam-Chickering color space or any equivalent color space.

Applications

The compositions of the invention are suitable for use in any steps of the domestic treatment, that is as a pre-treatment composition, as a wash additive as a composition suitable for use in the rinse-cycle of the laundry cycle or applied on a dryer-sheet. Obviously, for the purpose of the invention, multiple applications can be made such as treating the fabric with a pre-treatment composition of the invention and also thereafter with a composition of the invention suitable for use in the rinse cycle and/or suitable for use as a dryer-sheet. The compositions of the invention may also be in a spray, foam, or aerosol form which for example can be suitable for use while ironing, or applied on the surfaces of the tumble dryer.

The invention is illustrated in the following non limiting examples, in which all percentages are on an active weight basis unless otherwise stated.

In the examples, the abbreviated component identifications have the following meanings:

| | |
|---|---|
| DEQA: | Di-(tallowyl-oxy-ethyl) dimethyl ammonium chloride |
| DOEQA: | Di-(oleyloxyethyl) dimethyl ammonium methylsulfate |
| DTDMAC: | Ditallow dimethylammonium chloride |
| DHEQA: | Di-(soft-tallowyl-oxy-ethyl) hydroxyethyl methyl ammonium methylsulfate |
| Fatty acid: | tallow fatty acid IV = 18 |
| Electrolyte: | Calcium chloride |
| DTDMAMS: | Ditallow dimethyl ammonium methylsulfate |
| SDASA: | 1:2 Ratio of stearyldimethyl amine:triple-pressed stearic acid |
| Glycosperse S-20: | Polyethoxylated sorbitan monostearate available from Lonza |
| Clay: | Calcium Bentonite Clay, Bentonite L, sold by Southern Clay Products |
| TAE25: | Tallow alcohol ethoxylated with 25 moles of ethylene oxide per mole of alcohol |
| PEG: | Polyethylene Glycol 4000 |
| PEI 1800 E1: | Ethoxylated polyethylene imine (MW 1800, at 50% active) as synthesised in Synthesis example 1 |
| PEI 1800 E3: | Ethoxylated polyethylene imine (MW 1800, at 50% active) as synthesised as per Synthesis example 1 |
| PEI 1800 E7 AO: | Amine oxide of ethoxylated polyethylene imine (MW 1800, at 50% active) as synthesised as per Synthesis example 4 |
| PEI 1200 E1: | Ethoxylated polyethylene imine (MW 1200, at 50% active in water) as synthesised in Synthesis example 5 |
| PEI 1200 E2: | Ethoxylated polyethylene imine (MW 1200, at 50% active in water) as synthesised per Synthesis example 5 |
| PEI 1200 E7: | Ethoxylated polyethylene imine (MW 1200, at 50% active in water) as synthesised per Synthesis example 5 |
| PEI 1200 E7 AO: | Amine oxide of ethoxylated polyethylene imine (MW 1200, at 50% active) as synthesised as per Synthesis example 5 and 4 |
| Dye Fix 1: | Cationic dye fixing agent (50% active) available under the tradename Tinofix Eco from Ciba-Geigy |
| Dye Fix 2: | Emulsified cationic dye fixative (30% active) available under the tradename Rewin SRF-O from CHT-Beitlich |
| NH4Cl: | Ammonium chloride |
| LAS: | Sodium linear $C_{12}$ alkyl benzene sulphonate |
| TAS: | Sodium tallow alcohol sulphate |
| C25AS: | Sodium $C_{12}$-$C_{15}$ linear alkyl sulphate |
| CxyEzS: | Sodium $C_{1x}$-$C_{1y}$ branched alkyl sulphate condensed with z moles of ethylene oxide |
| C45E7: | A $C_{14-15}$ predominantly linear primary alcohol condensed with an average of 7 moles of ethylene oxide |
| C25 E3: | A $C_{12-15}$ branched primary alcohol condensed with an average of 3 moles of ethylene oxide |
| Cationic ester: | Mixture of $C_{12}/C_{14}$ choline ester |
| Soap: | Sodium linear alkyl carboxylate derived from an 80/20 mixture of tallow and a coconut oils. |
| TFAA: | $C_{16}$-$C_{18}$ alkyl N-methyl glucamide |
| TPKFA: | $C_{12}$-$C_{14}$ topped whole cut fatty acids |
| Zeoilte A: | Hydrated Sodium Aluminosilicate of formula $Na_{12}(AlO_2SiO_2)_{12}.27H_2O$ having a primary particle size in the range from 0.1 to 10 micrometers |
| Citric acid: | Anhydrous citric acid |
| Carbonate: | Anhydrous sodium carbonate with a particle size between 200 $\mu$m and 900 $\mu$m |
| Silicate: | Amorphous Sodium Silicate ($SiO_2:Na_2O$; 2.0 ratio) |
| Sulphate: | Anhydrous sodium sulphate |
| Citrate: | Tri-sodium citrate dihydrate of activity 86.4% with a particle size distribution between 425 $\mu$m and 850 $\mu$m |
| MA/AA: | Copolymer of 1:4 maleic/acrylic acid, average molecular weight about 70,000. |
| CMC: | Sodium carboxymethyl cellulose |
| Savinase: | Proteolytic enzyme of activity 4 KNPU/g |
| Carezyme: | Cellulytic enzyme of activity 1000 CEVU/g unless otherwise stated |
| Termamyl: | Amylolytic enzyme of activity 60 KNU/g |
| Lipolase: | Lipolytic enzyme of activity 100 kLU/g all sold by NOVO Industries A/S and of activity mentioned above unless otherwise specified |
| PB4: | Sodium perborate tetrahydrate of nominal formula $NaBO_2.3H_2O.H_2O_2$ |
| PB1: | Anhydrous sodium perborate bleach of nominal formula $NaBO_2.H_2O_2$ |
| TAED: | Tetraacetyl ethylene diamine |
| DTPMP: | Diethylene triamine penta (methylene phosphonate), marketed by Monsanto under the Trade name Dequest 2060 |
| Photoactivated: | Sulphonated Zinc Phthlocyanin encapsulated in |

| | |
|---|---|
| Brightener: | bleach dextrin soluble polymer<br>Disodium 4,4'-bis(4-anilino-6-morpholino 1,3,5-triazin-2-yl)amino) stilbene-2:2'-disulphonate. |
| Silicone antifoam: | Polydimethyldiloxane foam controller with Siloxane-oxyalkylene copolymer as dispersing agent with a ratio of sold foam controller to sold dispersing agent of 10:1 to 100:1. |

SYNTHESIS EXAMPLE 1

Preparation of PEI 1800 $E_1$

Step A)-The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide (ARC) is set up to deliver ethylene oxide as a liquid by a pump to the autoclave with the cylinder placed on a scale so that the weight change of the cylinder could be monitored.

A 750 g portion o f polyethyleneimine (PEI) (Nippon Shokubai, Epomin SP-018 having a listed average molecular weight of 1800 equating to 0.417 moles of polymer and 17.4 moles of nitrogen functions) is added to the autoclave. The autoclave is then sealed and purged of air (by applying vacuum to minus 28" Hg followed by pressurization with nitrogen to 250 psia, then venting to atmospheric pressure). The autoclave contents are heated to 130° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the Course of the reaction. After a total of 750 grams of ethylene oxide has been charged to the autoclave (roughly equivalent to one mole ethylene oxide per PEI nitrogen function), the temperature is increased to 110° C. and the autoclave is allowed to stir for an additional hour. At this point, vacuum is applied to remove any residual unreacted ethylene oxide.

Step B)-The reaction mixture is then deodorized by passing about 100 cu. ft. of inert gas (argon or nitrogen) through a gas dispersion frit and through the reaction mixture while agitating and heating the mixture to 130° C.

The final reaction product is cooled slightly and collected in glass containers purged with nitrogen.

In other preparations the neutralization and deodorization is accomplished in the reactor before discharging the product.

If a PEI 1800 $E_7$ is desired, the following step of catalyst addition will be included between Step A and B.

Vacuum is continuously applied while the autoclave is cooled to about 50° C. while introducing 376 g of a 25% sodium methoxide in methanol solution (1.74 moles, to achieve a 10% catalyst loading based upon PEI nitrogen functions). The methoxide solution is sucked into the autoclave under vacuum and then the autoclave temperature controller setpoint is increased to 130° C. A device is used to monitor the power consumed by the agitator. The agitator power is monitored along with the temperature and pressure. Agitator power and temperature values gradually increase as methanol is removed from the autoclave and the viscosity of the mixture increases and stabilizes in about 1 hour indicating that most of the methanol has been removed. The mixture is further heated and agitated under vacuum for an additional 30 minutes. Vacuum is removed and the autoclave is cooled to 105° C. while it is being charged with nitrogen to 250 psia, and then vented to ambient pressure. The autoclave is charged to 200 psia with nitrogen. Ethylene oxide is again added to the autoclave incrementally as before while closely monitoring the autoclave pressure, temperature, and ethylene oxide flow rate while maintaining the temperature between 100 and 110 ° C. and limiting any temperature increases due to reaction exotherm. After the addition of 4500 g of ethylene oxide (resulting in a total of 7 moles of ethylene oxide per mole of PEI nitrogen function) is achieved over several hours, the temperature is increased to 110° C. and the mixture stirred for an additional hour.

The reaction mixture is then collected in nitrogen purged containers and eventually transferred into a 22 L three neck round bottomed flask equipped with heating and agitation. The strong alkali catalyst is neutralized by adding 167 g methanesulfonic acid (1.74 moles).

Other preferred examples such as PEI 1800 E2, PEI 1800 E3, PEI 1800 E15 and PEI 1800 E20 can be prepared by the above method by adjusting the reaction time and the relative amount of ethylene oxide used in the reaction.

SYNTHESIS EXAMPLE 2

4.7% Quaternization of PEI 1800 E7

To a 500 ml erlenmeyer flask equipped with a magnetic stirring bar is added poly(ethyleneimine), MW 1800 ethoxylated to a degree of 7 (224 g, 0.637 mol nitrogen, prepared as in SYNTHESIS EXAMPLE 1) and acetonitrile (Baker, 150 g, 3.65 mol). Dimethyl sulfate (Aldrich, 3.8 g, 0.030 mol) is added all at once to the rapidly stirring solution, which is then stoppered and stirred at room temperature overnight. The acetonitrile is evaporated on the rotary evaporator at ~60° C., followed by a Kugelrohr apparatus (Aldrich) at ~80° C. to afford ~220 g of the desired material as a dark brown viscous liquid. A $^{13}$C-NMR ($D_2O$) spectrum shows the absence of a peak at ~58 ppm corresponding to dimethyl sulfate. A $^1$H-NMR ($D_2O$) spectrum shows the partial shifting of the peak at 2.5 ppm (methylenes attached to unquaternized nitrogens) to ~3.0 ppm.

SYNTHESIS EXAMPLE 3

Oxidation of 4.7% Quaternized PEI 1800 E7

To a 500 ml erlenmeyer flask equipped with a magnetic stirring bar is added poly(ethyleneimine), MW 1800 which has been ethoxylated to a degree of 7, and ~4.7% quaternized with dimethyl sulfate (121.7 g, ~0.32 mol oxidizeable nitrogen, prepared as in SYNTHESIS EXAMPLE 2), hydrogen peroxide (Aldrich, 40 g of a 50 wt % solution in water, 0.588 mol), and water (109.4 g). The flask is stoppered, and after an initial exotherm the solution is stirred at room temperature overnight. A $^1$H-NMR ($D_2O$) spectrum shows the total shifting of the methylene peaks at 2.5–3.0 ppm to ~3.5 ppm. To the solution is added ~5 g of 0.5% Pd on alumina pellets, and the solution is allowed to stand at room temperature for ~3 days. Peroxide indicator paper shows that no peroxide is left in the system. The material is stored as a 46.5% solution in water.

SYNTHESIS EXAMPLE 4

Formation of Amine Oxide of PEI 1800 $E_7$

To a 500 mL Erlenmeyer flask equipped with a magnetic stirring bar is added polyethyleneimine having a molecular weight of 1800 and ethoxylated to a degree of about 7 ethoxy groups per nitrogen (PEI-1800, $E_7$) (209 g, 0.595 mol nitrogen, prepared as in SYNTHESIS EXAMPLE 1), and hydrogen peroxide (120 g of a 30 wt % solution in water, 1.06 mol). The flask is stoppered, and after an initial exotherm the solution is stirred at room temperature overnight. $^1$H-NMR ($D_2O$) spectrum obtained on a sample of the reaction mixture indicates complete conversion. The resonances ascribed to methylene protons adjacent to unoxidized nitrogens have shifted from the original position at ~2.5 ppm to ~3.5 ppm. To the reaction solution is added approximately 5 g of 0.5% Pd on alumina pellets, and the solution is allowed to stand at room temperature for approximately 3 days. The solution is tested and found to be negative for peroxide by indicator paper. The material as obtained is suitably stored as a 51.1% active solution in water.

SYNTHESIS EXAMPLE 5
Preparation of PEI 1200 $E_1$

Step A)-The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide (ARC) is set up to deliver ethylene oxide as a liquid by a pump to the autoclave with the cylinder placed on a scale so that the weight change of the cylinder could be monitored.

A 750 g portion of polyethyleneimine (PEI) (having a listed average molecular weight of 1200 equating to about 0.625 moles of polymer and 17.4 moles of nitrogen functions) is added to the autoclave. The autoclave is then sealed and purged of air (by applying vacuum to minus 28" Hg followed by pressurization with nitrogen to 250 psia, then venting to atmospheric pressure). The autoclave contents are heated to 130° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the course of the reaction. After a total of 750 grams of ethylene oxide has been charged to the autoclave (roughly equivalent to one mole ethylene oxide per PEI nitrogen function), the temperature is increased to 110° C. and the autoclave is allowed to stir for an additional hour. At this point, vacuum is applied to remove any residual unreacted ethylene oxide.

Step B)-The reaction mixture is then deodorized by passing about 100 cu. ft. of inert gas (argon or nitrogen) through a gas dispersion frit and through the reaction mixture while agitating and heating the mixture to 130° C.

The final reaction product is cooled slightly and collected in glass containers purged with nitrogen.

In other preparations the neutralization and deodorization is accomplished in the reactor before discharging the product.

If a PEI 1200 $E_7$ is desired, the following step of catalyst addition will be included between Step A and B.

Vacuum is continuously applied while the autoclave is cooled to about 50° C. while introducing 376 g of a 25% sodium methoxide in methanol solution (1.74 moles, to achieve a 10% catalyst loading based upon PEI nitrogen functions). The methoxide solution is sucked into the autoclave under vacuum and then the autoclave temperature controller setpoint is increased to 130° C. A device is used to monitor the power consumed by the agitator. The agitator power is monitored along with the temperature and pressure. Agitator power and temperature values gradually increase as methanol is removed from the autoclave and the viscosity of the mixture increases and stabilizes in about 1 hour indicating that most of the methanol has been removed. The mixture is further heated and agitated under vacuum for an additional 30 minutes. Vacuum is removed and the autoclave is cooled to 105° C. while it is being charged with nitrogen to 250 psia and then vented to ambient pressure. The autoclave is charged to 200 psia with nitrogen. Ethylene oxide is again added to the autoclave incrementally as before while closely monitoring the autoclave pressure, temperature, and ethylene oxide flow rate while maintaining the temperature between 100 and 110° C. and limiting any temperature increases due to reaction exotherm. After the addition of 4500 g of ethylene oxide (resulting in a total of 7 moles of ethylene oxide per mole of PEI nitrogen function) is achieved over several hours, the temperature is increased to 110° C. and the mixture stirred for an additional hour.

The reaction mixture is then collected in nitrogen purged containers and eventually transferred into a 22 L three neck round bottomed flask equipped with heating and agitation. The strong alkali catalyst is neutralized by adding 167 g methanesulfonic acid (1.74 moles).

Other preferred examples such as PEI 1200 E2, PEI 1200 E3, PEI 1200 E15 and PEI 1200 E20 can be prepared by the above method by adjusting the reaction time and the relative amount of ethylene oxide used in the reaction.

The corresponding amine oxide of the above ethoxylated PEI can also be prepared following synthesis Example 4.

SYNTHESIS EXAMPLE 6
9.7% Quaternization of PEI 1200 E7

To a 500 ml erlenmeyer flask equipped with a magnetic stirring bar is added poly(ethyleneimine), MW 1200 ethoxylated to a degree of 7 (248.4 g, 0.707 mol nitrogen, prepared as in SYNTHESIS EXAMPLE 5) and acetonitrile (Baker, 200 mL). Dimethyl sulfate (Aldrich, 8.48 g, 0.067 mol) is added all at once to the rapidly stirring solution, which is then stoppered and stirred at room temperature overnight. The acetonitrile is evaporated on the rotary evaporator at ~60° C., followed by a Kugelrohr apparatus (Aldrich) at ~80° C. to afford ~220 g of the desired material as a dark brown viscous liquid. A $^{13}$C-NMR ($D_2O$) spectrum shows the absence of a peak at ~58 ppm corresponding to dimethyl sulfate. A $^1$H-NMR ($D_2O$) spectrum shows the partial shifting of the peak at 2.5 ppm (methylenes attached to unquaternized nitrogens) to ~3.0 ppm.

SYNTHESIS EXAMPLE 7
4.7% Oxidation of 9.5% Quaternized PEI 1200 E7

To a 500 ml erlenmeyer flask equipped with a magnetic stirring bar is added poly(ethyleneimine), MW 1200 which has been ethoxylated to a degree of 7, and ~9.5% quaternized with dimethyl sulfate (144 g, ~0.37 mol oxidizeable nitrogen, prepared as in Example 6), hydrogen peroxide (Aldrich, 35.4 g of a 50 wt % solution in water, 0.52 mol), and water (100 g). The flask is stoppered, and after an initial exotherm the solution is stirred at room temperature overnight. A $^1$H-NMR ($D_2O$) spectrum shows the total shifting of the methylene peaks at 2.5–3.0 ppm to ~3.5 ppm. To the solution is added just enough sodium bisulfite as a 40% water solution to bring the residual peroxide level down to 1–5 ppm. The sodium sulfate which forms causes an aqueous phase to separate which contains salts, but little or no organics. The aqueous salt phase is removed and the desired oxidized polyethyleneimine derivative is obtained and stored as a 52% solution in water.

The following are non-limiting examples of the hydrophilic perfume compositions that are used herein:

| Perfume ingredients | 1 Wt. % | 2 Wt. % | 3 Wt. % |
|---|---|---|---|
| 3,7-Dimethyl-6-octenol | 10 | — | 5 |
| Benzyl salicylate | 5 | 20 | 5 |
| Benzyl acetate | 10 | 15 | 5 |
| Benzophenone | 3 | 5 | — |
| Octahydro-3,6,8,8-tetramethyl-1H-3A, 7-methanoazuten-6-ol | 2 | — | — |
| 3-Methylene-7-methyl octan-7-ol | 10 | — | 5 |
| Dihydro-nor-cyclopentadienyl acetate | 5 | — | 5 |
| 1,3,4,6,7,8-Hexahydro-4,6,6,7,8,8-hexamethyl-cyclopenta-gamma-2-benzopyrane | 10 | — | — |
| Phenyl ethyl alcohol | 15 | 10 | 20 |
| 3-Hydroxy-3,7-dimethyl-1,6-octadiene acetate | 4 | — | 5 |
| 3-Hydroxy-3,7-dimethyl-1,6-octadiene | 6 | 15 | 5 |
| Methyl dihydro jasmonate | 3 | 10 | 5 |
| 2-Methyl-3(para tert butylphenyl) propionaldehdye | 10 | 15 | 20 |
| Phenyl ethyl acetate | 2 | 5 | 1 |
| 4-Hydroxy-3-methoxybenzaldehyde | — | 1 | — |
| para-Menth-1-en-8-ol, para-menth-1-en-1-ol | 5 | — | 8 |
| Anisic aldehyde | — | — | 2 |
| Coumarin | — | — | 5 |
| 2-Methyl-3-(para iso propylphenyl) propionaldehyde | — | — | 3 |
| Total | 100 | 100 | 100 |

| Perfume Material | 4 Wt. % | 5 Wt. % |
|---|---|---|
| Amyl salicylate | 8 | — |
| Benzyl acetate | 8 | 8 |
| Benzyl Salicylate | — | 2 |
| Citronellol | 7 | 27 |
| Dihydromyrcenol | 2 | — |
| Eugenol | 4 | — |
| Flor acetate | 8 | — |
| Galaxolide | 1 | — |
| Geraniol | 5 | — |
| Hexyl cinnamic aldehyde | 2 | — |
| Hydroxycitronellal | 3 | — |
| Lilial | 2 | — |
| Linalool | 12 | 13 |
| Linalyl acetate | 5 | — |
| Lyral | 3 | — |
| Methyl dihydrojasmonate | 3 | — |
| Nerol | 2 | — |
| Phenoxy ethyl propionate | 3 | — |
| Phenylethyl acetate | 5 | 17 |
| Phenylethyl alcohol | 8 | 17 |
| alpha-Terpineol | 5 | 13 |
| alpha-Terpinene | 5 | — |
| Tetrahydromyrcenol | 2 | — |
| Total | 100 | 100 |

EXAMPLE 1

The following compositions are in accordance with the present invention

| Component | A | B | C | D | E | F | G | H | I | J |
|---|---|---|---|---|---|---|---|---|---|---|
| DEQA | 2.6 | 2.9 | 18.0 | 19.0 | 19.0 | 19.0 | — | — | — | — |
| TAE25 | — | — | 1.0 | — | — | — | — | — | — | — |
| Fatty acid | 0.3 | — | 1.0 | — | — | — | — | — | — | — |
| Hydrochloride acid | 0.02 | 0.02 | 0.02 | 0.02 | 0.02 | 0.02 | — | — | — | — |
| PEG | — | — | 0.6 | 0.6 | 0.6 | 0.6 | — | — | — | — |
| Perfume 3 | 1.0 | — | 1.0 | — | — | 1.0 | — | — | 0.1 | — |
| Perfume 4 | — | 1.0 | — | 1.0 | 1.0 | — | 0.1 | 0.1 | — | 0.1 |
| Silicone antifoam | 0.01 | 0.01 | 0.01 | 0.01 | 0.01 | 0.01 | — | — | — | — |
| PEI 1200 E1 | 3 | 3 | 3 | 3 | 3 | — | 15 | 15 | — | 10 |
| PEI 1200 E2 | — | — | — | — | — | 3 | — | — | 10 | — |
| Dye fix 1 | — | 1 | 1 | 1 | 1 | — | — | — | 10 | — |
| Dye fix 2 | — | 2 | 2 | 2 | 2 | — | — | — | — | — |
| Electrolyte (ppm) | — | — | 600 | 600 | 600 | 1200 | — | — | — | — |
| Dye (ppm) | 10 | 10 | 50 | 50 | 50 | 50 | — | — | — | — |
| NH4Cl | — | — | — | — | 0.5 | — | — | 1.0 | — | — |
| Water and minors to balance to 100 | | | | | | | | | | |

| Component | K | L | M | N | O | P | Q | R | S |
|---|---|---|---|---|---|---|---|---|---|
| DTDMAC | — | — | — | — | — | — | — | 4.5 | 15 |
| DEQA | 2.6 | 2.9 | 18.0 | 19.0 | 19.0 | — | — | — | — |
| TAE25 | 0.3 | — | 1.0 | — | 0.1 | — | — | — | — |
| Fatty acid | 0.3 | — | 1.0 | — | — | — | — | — | — |
| Hydrochloride acid | 0.02 | 0.02 | 0.02 | 0.02 | 0.02 | — | — | 0.02 | 0.02 |
| PEG | — | — | 0.6 | 0.6 | 0.6 | — | — | — | 0.6 |
| Perfume 3 | — | 1.0 | — | 1.0 | 1.0 | — | 0.1 | — | 1.0 |
| Perfume 4 | 1.0 | — | 1.0 | — | — | 0.1 | — | 1.0 | — |
| Silicone antifoam | 0.01 | 0.01 | 0.01 | 0.01 | 0.01 | — | — | 0.01 | 0.01 |
| PEI 1800 E1 | 3 | — | — | 3 | — | 10 | — | — | 3 |
| PEI 1200 E1 | — | 3 | 3 | — | 3 | — | 15 | 3 | — |

-continued

| | | | | | | | | | |
|---|---|---|---|---|---|---|---|---|---|
| Dye fix 1 | 1 | — | 1 | 1 | 3 | 10 | 5 | 1 | 1 |
| Dye fix 2 | 2 | — | 2 | 2 | — | — | — | 2 | 2 |
| Electrolyte (ppm) | — | — | 600 | 600 | 1200 | — | — | — | 600 |
| Dye (ppm) | 10 | 10 | 50 | 50 | 50 | — | — | 10 | 50 |
| Carezyme CEFU/g of composition | — | — | — | — | 50 | — | — | — | — |
| Water and minors to balance to 100 | | | | | | | | | |

EXAMPLE 2

The following compositions for use as dryer-added sheets are in accordance with the invention

| | T | U | V | W | X | Y |
|---|---|---|---|---|---|---|
| DOEQA | 40 | 25 | — | — | — | — |
| DHEQA | — | — | 20 | — | — | — |
| DTDMAMS | — | — | — | 20 | 12 | 60 |
| SDASA | 30 | 30 | 20 | 30 | 20 | — |
| Glycosperse S-20 | — | — | 10 | — | — | — |
| Glycerol Monostearate | — | — | — | 20 | 10 | — |
| Clay | 4 | 4 | 3 | 4 | 4 | — |
| Perfume 1 | 0.7 | 1.1 | 0.7 | 1.6 | 2.6 | 1.4 |
| PEI 1800 E1 | — | 5 | — | — | — | — |
| PEI 1200 E1 | — | — | 4 | 2.2 | — | — |
| PEI 1800 E3 | 2 | — | — | — | 5 | 7.0 |
| Dye fix 1 | 2 | 5 | 4 | 2.2 | 5 | 3 |
| Stearic acid to balance | | | | | | |

EXAMPLE 3

The following detergent formulations X and Y, are in accordance with the present invention:

| | Z | AA |
|---|---|---|
| Zeolite A | 24.0 | 23.0 |
| Sulphate | 9.0 | — |
| MA/AA | 4.0 | 4.0 |
| LAS | 8.0 | 8.0 |
| TAS | — | 2.0 |
| Silicate | 3.0 | 3.0 |
| CMC | 1.0 | 0.4 |
| Brightener | 0.2 | — |
| Soap | 1.0 | — |
| DTPMP | 0.4 | 0.4 |
| C45E7 | 2.5 | 2.0 |
| C25E3 | 2.5 | 2.0 |
| Silicone antifoam | 0.3 | 5.0 |
| Perfume 5 | 0.3 | 0.3 |
| Carbonate | 13.0 | 16.0 |
| Citrate | — | 5.0 |
| PB4 | 18.0 | — |
| PB1 | 4.0 | 14.0 |
| TAED | 3.0 | 6.0 |
| Photoactivated bleach | 0.02% | — |
| Savinase | 1.0 | 1.0 |
| Lipolase | 0.4 | 0.4 |
| Termamyl | 0.30 | 0.6 |
| Carezyme | — | 0.6 |
| PEI 1800 E7 AO | 1.0 | — |
| PEI 1200 E7 AO | — | 1.0 |
| Balance (Moisture and Miscellaneous) to 100 | | |

EXAMPLE 4

The following liquid detergent formulation, according to the present invention was prepared:

| | AB |
|---|---|
| C25AS | 13 |
| C25E3S | 2 |
| TFAA | 6 |
| C12-14 alkyl dimethylhydroxy ethyl ammonium chloride | 1 |
| Cationic ester | 1.5 |
| TPKFA | 15 |
| Citric acid | 1 |
| Ethanol | 2 |
| 1,2 Propanediol | 8 |
| NaOH up to pH | 7.5 |
| DTPMP | 1.2 |
| Savinase | 0.5 |
| Termamyl (300 KNU/g) | 0.15 |
| Boric acid | 1.5 |
| Softening clay of the bentonite type | 4 |
| Suspending clay SD3 | 0.3 |
| PEI 1200 E7 | 1 |
| Perfume 2 | 0.5 |
| Balance (Moisture and Miscellaneous) | 100 |

What is claimed is:

1. A composition comprising a perfume and an amino-functional polymer, characterised in that at least 25% by weight of the perfume comprises perfume ingredients having a Clog P of 3 or smaller, and wherein said amino-functional polymer comprises a polyamine backbone corresponding to the formula:

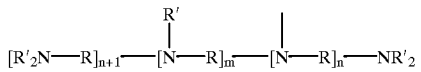

having a polyamine formula $V_{(n+1)}W_mY_nZ$ or a polyamine backbone corresponding to the formula:

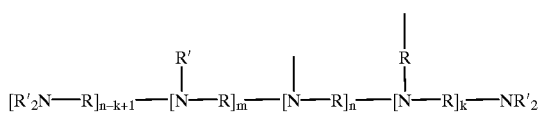

having a polyamine formula $V_{(n-k+1)}W_mY_nY'_kZ$, wherein k is less than or equal to n, said polyamine backbone has a molecular weight greater than 200 daltons, wherein i) V units are terminal units having the formula:

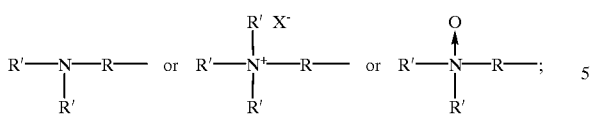

ii) W units are backbone units having the formula:

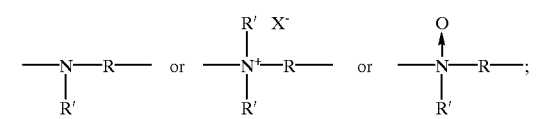

iii) Y units are branching units having the formula:

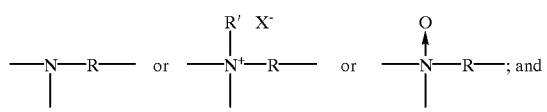

iv) Y' units are branch point for a backbone or branch ring having the formula:

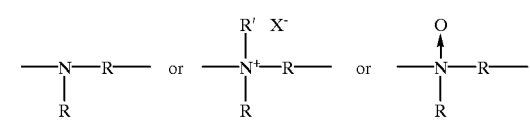

v) Z units are terminal units having the formula:

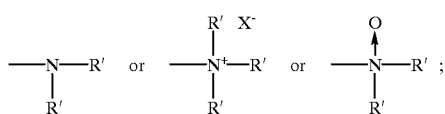

wherein backbone linking R units are selected from the group consisting of $C_2$–$C_{12}$ alkylene, $C_4$–$C_{12}$ alkenylene, $C_3$–$C_{12}$ hydroxyalkylene, $C_4$–$C_{12}$ dihydroxy-alkylene, $C_8$–$C_{12}$ dialkylarylene, —($R^1O)_xR^1$—, —($R^1O)_xR^5(OR^1)_x$—, —($CH_2CH(OR^2)CH_2O)_z(R^1O)_yR^1(OCH_2CH(OR^2)CH_2)_w$—, —$C(O)(R^4)_rC(O)$—, —$CH_2CH(OR^2)CH_2$—, and mixtures thereof; wherein $R^1$ is selected from the group consisting of $C_2$–$C_6$ alkylene and mixtures thereof; $R^2$ is selected from the group consisting of hydrogen, —($R^1O)_xB$, and mixtures thereof; $R^4$ is selected from the group consisting of $C_1$–$C_{12}$ alkylene, $C_4$–$C_{12}$ alkenylene, $C_8$–$C_{12}$ arylalkylene, $C_6$–$C_{10}$ arylene, and mixtures thereof; $R^5$ is selected from the group consisting of $C_1$–$C_{12}$ alkylene, $C_3$–$C_{12}$ hydroxyalkylene, $C_4$–$C_{12}$ dihydroxy-alkylene, $C_8$–$C_{12}$ dialkylarylene, —C(O)—, —C(O)NHR$^6$NHC(O)—, —$R^1(OR^1)$—, —C(O)($R^4)_rC(O)$—, —$CH_2CH(OH)CH_2$—, —$CH_2CH(OH)CH_2O(R^1O)_yR^1OCH_2CH(OH)CH_2$—, and mixtures thereof; $R^6$ is selected from the group consisting of $C_2$–$C_{12}$ alkylene or $C_6$–$C_{12}$ arylene; R' units are selected from the group consisting of hydrogen, $C_1$–$C_{22}$ alkyl, $C_3$–$C_{22}$ alkenyl, $C_7$–$C_{22}$ arylalkyl, $C_2$–$C_{22}$ hydroxyalkyl, —$(CH_2)_pCO_2M$, —$(CH_2)_qSO_3M$, —$CH(CH_2CO_2M)CO_2M$, —$(CH_2)_pPO_3M$, —($R^1O)_xB$, —$C(O)R^3$, and mixtures thereof; B is selected from the group consisting of hydrogen, $C_1$–$C_6$ alkyl, —$(CH_2)_qSO_3M$, —$(CH_2)_pCO_2M$, —$(CH_2)_q(CHSO_3M)CH_2SO_3M$, —$(CH_2)_q$—$(CHSO_2M)CH_2SO_3M$, —$(CH_2)_pPO_3M$, —$PO_3M$, and mixtures thereof; $R^3$ is selected from the group consisting of $C_1$–$C_{18}$ alkyl, $C_7$–$C_{12}$ arylalkyl, $C_7$–$C_{12}$ alkyl substituted aryl, $C_6$–$C_{12}$ aryl, and mixtures thereof; M is hydrogen or a water soluble cation in sufficient amount to satisfy charge balance; X is a water soluble anion; m has the value from 2 to 700; n has the value from 0 to 350; p has the value from 1 to 6, q has the value from 0 to 6; r has the value of 0 or 1; w has the value 0 or 1; x has the value from 1 to 100; y has the value from 0 to 100; z has the value 0 or 1.

2. A composition according to claim 1, wherein R' units are selected from the group consisting of hydrogen, $C_3$–$C_{22}$ hydroxyalkyl, benzyl, $C_1$–$C_{22}$ alkyl, —($R^1O)_xB$, —$C(O)R^3$, —$(CH_2)_pCO_2$—M$^+$, —$(CH_2)_qSO_3$$^-$M$^+$, —$CH(CH_2CO_2M)CO_2M$ and mixtures thereof.

3. A composition according to claim 2, wherein R' units are selected from the group consisting of hydrogen, $C_1$–$C_{22}$ alkyl, —($R^1O)_xB$, —$C(O)R^3$, and mixtures thereof.

4. A composition according to claim 3, wherein R' units are —($R^1O)_xB$.

5. A composition according to claim 4, wherein x has a value lying in the range of from about 1 to about 20.

6. A composition according to claim 5, wherein x has a value lying in the range of from about 1 to about 10.

7. A composition according to claim 1, wherein at least 50% by weight of the perfume comprises perfume ingredients having a Clog P of 3 or smaller.

8. A composition according to claim 7 wherein at least 75% by weight of the perfume comprises perfume ingredients having a Clog P of 3 or smaller.

9. A composition according to claim 1, wherein said perfume ingredients are selected from the group consisting of benzaldehyde, benzyl acetate, cis-3-hexenyl acetate, coumarin, dihydromyrcenol, dimethyl benzyl carbinyl acetate, ethyl vanillin, eucalyptol, eugenol, iso eugenol, flor acetate, geraniol, hydroxycitronellal, koavone, linalool, methyl anthranilate, methyl beta naphthyl ketone, methyl dihydro jasmonate, nerol, nonalactone, phenyl ethyl acetate, phenyl ethyl alcohol, alpha terpineol, beta terpineol, vanillin, and mixtures thereof.

10. A composition according to claim 1, wherein said composition further comprises a dye fixing agent.

11. A composition according to claim 10, wherein said dye fixing agent is cationic.

12. A composition according to claim 11, wherein said dye fixing agent is polycationic.

13. A composition according to claim 1, wherein said composition further comprises a dispersible polyolefin.

14. A composition according to claim 1, wherein said composition further comprises a fabric softener.

15. A composition according to claim 14, wherein said composition comprises a biodegradable cationic fabric softener selected from the group consisting of quaternary ammonium compounds and amine precursors having the formula (I) or (II), below:

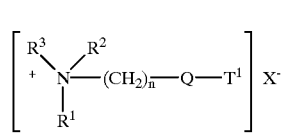

or

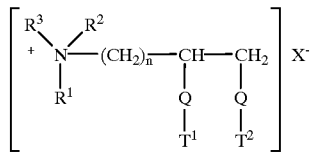

(II)

wherein Q is selected from —O—C(O)—, —C(O)—O—, —O—C(O)—O—, —NR$^4$—C(O)—, —C(O)—NR$^4$—;

$R^1$ is $(CH_2)_n$—Q—$T^2$ or $T^3$;

$R^2$ is $(CH_2)_m$—Q—$T^4$ or $T^5$ or $R^3$;

$R^3$ is $C_1$–$C_4$ alkyl or $C_1$–$C_4$ hydroxyalkyl or H;

$R^4$ is H or $C_1$–$C_4$ alkyl or $C_1$–$C_4$ hydroxyalkyl;

$T^1$, $T^2$, $T^3$, $T^4$, $T^5$ are independently $C_6$–$C_{22}$ alkyl or alkenyl;

n and m are integers from about 1 to about 4; and $X^-$ is a softener-compatible anion.

16. A composition according to claim 1, wherein said composition further comprises one or more detersive ingredients.

17. A composition according to claim 1, wherein said composition further comprises an enzyme.

18. A composition according to claim 17, wherein said enzyme is a cellulase.

19. A composition according to claim 1, wherein said composition is in a liquid form.

20. A composition according to claim 19, wherein said composition is applied on a substrate.

21. A composition according to claim 20, wherein said substrate is a dryer-sheet.

22. A method for providing color care and perfume substantivity on fabrics upon domestic treatment which comprises the step of contacting the fabrics with a composition according to claim 1.

23. A method according to claim 22, wherein said contacting step occurs in aqueous medium.

24. A method according to claim 23, wherein said aqueous medium is at a temperature between about 2 to about 40° C.

25. A method according to claim 24, wherein said aqueous medium is at a temperature between about 5 to about 25° C.

* * * * *

UNITED STATES PATENT AND TRADEMARK OFFICE
CERTIFICATE OF CORRECTION

PATENT NO. : 6,103,678
DATED : August 15, 2000
INVENTOR(S) : Massachelein et al.

It is certified that error appears in the above-identified patent and that said Letters Patent is hereby corrected as shown below:

In the title, item [54], please delete "COMPOSITIONS COMPRISING A PERFUME AND AN AMINO-FUNCTIONAL POLYMER" and insert --FABRIC TREATMENT COMPOSITIONS--.

Col. 4, line 40, insert the structure --$VM_mZ$-- after the word "formula".

Col. 16, line 21, "306" should read --305--.

Col. 25, line 65, "Mixture" should read --mixture--.

Col. 37, line 20, "sold" should read --said--.

Col. 41, line 26, delete "1" from column 2 and insert --1-- into column 3.

Col. 42, line 19, delete "3" from column 4 and insert --3-- into column 5.

Col. 43, line 9, "CEFU/g" should read --CEVU/g--.

Col. 44, line 16 of Claim 1, "$V_{(n-k+1)}W_mY_nY'_kZ$" should read --$V_{(n-k+1)}W_mY_nY_kZ$--.

Signed and Sealed this

Twenty-fourth Day of April, 2001

Attest:

NICHOLAS P. GODICI

Attesting Officer

Acting Director of the United States Patent and Trademark Office